US008506305B2

(12) United States Patent
Graham et al.

(10) Patent No.: US 8,506,305 B2
(45) Date of Patent: Aug. 13, 2013

(54) ELECTRONIC LEARNING SYSTEM

(75) Inventors: David Jeffrey Graham, Caledon (CA); Allan A. Sura, Orangeville (CA)

(73) Assignee: Deck Chair Learning Systems Inc., Orangeville, CA (US)

( * ) Notice: Subject to any disclaimer, the term of this patent is extended or adjusted under 35 U.S.C. 154(b) by 920 days.

(21) Appl. No.: 12/342,281

(22) Filed: Dec. 23, 2008

(65) Prior Publication Data
US 2010/0159433 A1 Jun. 24, 2010

(51) Int. Cl.
*G09B 7/00* (2006.01)

(52) U.S. Cl.
USPC ........... 434/323; 434/118; 434/178; 434/352; 434/353

(58) Field of Classification Search
USPC ............... 434/118, 322, 323, 350–353, 362, 434/363
See application file for complete search history.

(56) References Cited

U.S. PATENT DOCUMENTS

| | | | | |
|---|---|---|---|---|
| 3,671,668 A * | 6/1972 | Reiffel | ........................... | 348/552 |
| 5,616,033 A * | 4/1997 | Kerwin | ........................... | 434/118 |
| 5,827,071 A * | 10/1998 | Sorensen et al. | ............... | 434/323 |
| 5,828,943 A * | 10/1998 | Brown | ........................... | 434/258 |
| 6,077,085 A | 6/2000 | Parry et al. | | |
| 6,282,404 B1 * | 8/2001 | Linton | ........................... | 434/350 |
| 6,418,298 B1 * | 7/2002 | Sonnenfeld | ................... | 434/350 |
| 6,551,109 B1 * | 4/2003 | Rudmik | ........................ | 434/322 |
| 6,978,115 B2 | 12/2005 | Whitehurst et al. | | |
| 6,986,664 B1 | 1/2006 | Thomas | | |
| 7,011,526 B2 * | 3/2006 | Boon | ........................... | 434/236 |
| 7,052,277 B2 * | 5/2006 | Kellman | ........................ | 434/118 |
| 7,056,124 B1 | 6/2006 | Scheuring | | |
| 7,059,860 B2 | 6/2006 | Linden-Henry | | |
| RE39,435 E | 12/2006 | Berman | | |
| 7,150,630 B2 * | 12/2006 | Budra et al. | ................... | 434/169 |
| 7,153,140 B2 | 12/2006 | Ivanir et al. | | |

(Continued)

FOREIGN PATENT DOCUMENTS

| | | |
|---|---|---|
| WO | 2005098787 A2 | 10/2005 |
| WO | 2007053695 A2 | 5/2007 |

OTHER PUBLICATIONS

Level of measurement,Wikipedia[online],[retrieved on Jun. 30, 2011], Retrieved from the internet: URL<http://en.wikipedia.org/wiki/Level_of_measurement>.*

(Continued)

*Primary Examiner* — Xuan Thai
*Assistant Examiner* — Sadaruz Zaman

(57) ABSTRACT

A question item comprising: textual, visual or auditory subject matter; a query or instruction pertaining to the subject matter; and a representation of a response mechanism for receiving a user response to the query or instruction, may be retrieved from a data store. The subject matter, query or instruction and response mechanism may be presented in a presentation sequence, wherein a presentation duration of each of the subject matter, query or instruction and response mechanism is controlled by user input. Based on the user input, a presentation duration of each of the subject matter, query or instruction, and response mechanism may be determined. Each of the three presentation durations may be stored. A completion time may be determined based on one or more of the presentation durations and may be stored along with response accuracy, for use in calculating a user competency measure for the question item. An algorithm for advancing through an electronic learning curriculum comprising multiple question items may also be provided.

20 Claims, 12 Drawing Sheets

(56) References Cited

U.S. PATENT DOCUMENTS

| | | |
|---|---|---|
| 7,186,116 B2 | 3/2007 | Klingberg |
| 7,318,052 B2 | 1/2008 | Bauer et al. |
| 7,335,028 B2 | 2/2008 | Sun |
| 7,828,554 B2 * | 11/2010 | Fustolo .................... 434/322 |
| 2006/0110718 A1 | 5/2006 | Lee et al. |
| 2006/0121432 A1 | 6/2006 | Sun |
| 2006/0246410 A1 | 11/2006 | Iwayama |
| 2007/0248938 A1 * | 10/2007 | Ronald .................... 434/178 |
| 2008/0003558 A1 * | 1/2008 | Chan et al. ................ 434/323 |

OTHER PUBLICATIONS

Weighted means, Wikipedia[online],[retrieved on Jun. 30, 2011], Retrieved from the internet: URL<http://en.wikipedia.org/wiki/Weighted_mean>.*

* cited by examiner (No Review Paths)

| Subject Matter 402 | Query/Instruction 404 | Response Mechanism 406 | Display Mode 408 | Completion Time Determination Criteria 410 | Minimum and/or Maximum Completion Time 412 | Hint or Help Information 414 | Correct Response(s) 416 | Feedback Information 418 | ... |

Question Record 400

FIG. 4

| | Curriculum 1 | | | | Curriculum 2 | | | | Curriculum 3 | | | | Curriculum 4 | | | |
|---|---|---|---|---|---|---|---|---|---|---|---|---|---|---|---|---|
| Session | set 1a CSS | set 1b CSS | set 1c CSS | set 1d CSS | set 2a CSS | set 2b CSS | set 2c CSS | set 2d CSS | set 3a CSS | set 3b CSS | set 3c CSS | set 3d CSS | set 4a CSS | set 4b CSS | set 4c CSS | set 4d CSS |
| s0 | 0 | 0 | 0 | 0 | 0 | 0 | 0 | 0 | 0 | 0 | 0 | 0 | 0 | 0 | 0 | 0 |
| s1 | 820 | 720 | 680 | 620 | 0 | 0 | 0 | 0 | 0 | 0 | 0 | 0 | 0 | 0 | 0 | 0 |
| s2 | 820 | 780 | 720 | 750 | 0 | 0 | 0 | 0 | 0 | 0 | 0 | 0 | 0 | 0 | 0 | 0 |
| s3 | 850 | 840 | 820 | 810 | 0 | 0 | 0 | 0 | 0 | 0 | 0 | 0 | 0 | 0 | 0 | 0 |
| s4 | 850 | 840 | 820 | 810 | 720 | 680 | 390 | 330 | 0 | 0 | 0 | 0 | 0 | 0 | 0 | 0 |
| s5 | 850 | 840 | 820 | 810 | 720 | 680 | 410 | 330 | 0 | 0 | 0 | 0 | 0 | 0 | 0 | 0 |
| s6 | 850 | 840 | 820 | 810 | 720 | 680 | 410 | 480 | 0 | 0 | 0 | 0 | 0 | 0 | 0 | 0 |
| s7 | 850 | 840 | 820 | 810 | 720 | 680 | 590 | 480 | 0 | 0 | 0 | 0 | 0 | 0 | 0 | 0 |
| s8 | 850 | 840 | 820 | 810 | 720 | 680 | 590 | 630 | 0 | 0 | 0 | 0 | 0 | 0 | 0 | 0 |
| s9 | 850 | 840 | 820 | 810 | 720 | 680 | 670 | 630 | 0 | 0 | 0 | 0 | 0 | 0 | 0 | 0 |
| s10 | 850 | 840 | 820 | 810 | 720 | 710 | 680 | 670 | 0 | 0 | 0 | 0 | 0 | 0 | 0 | 0 |
| s11 | 850 | 840 | 820 | 810 | 770 | 810 | 790 | 802 | 0 | 0 | 0 | 0 | 0 | 0 | 0 | 0 |
| s12 | 850 | 840 | 820 | 810 | 890 | 860 | 890 | 845 | 0 | 0 | 0 | 0 | 0 | 0 | 0 | 0 |
| s13 | 850 | 840 | 820 | 810 | 980 | 860 | 890 | 845 | 725 | 680 | 380 | 350 | 0 | 0 | 0 | 0 |
| s14 | 850 | 840 | 820 | 810 | 980 | 860 | 890 | 845 | 725 | 680 | 430 | 350 | 0 | 0 | 0 | 0 |
| s15 | 850 | 840 | 820 | 810 | 980 | 860 | 890 | 845 | 725 | 680 | 430 | 490 | 0 | 0 | 0 | 0 |
| s16 | 850 | 840 | 820 | 810 | 980 | 860 | 890 | 845 | 725 | 680 | 620 | 490 | 0 | 0 | 0 | 0 |
| s17 | 850 | 840 | 820 | 810 | 980 | 860 | 890 | 845 | 725 | 680 | 620 | 710 | 0 | 0 | 0 | 0 |
| s18 | 850 | 840 | 820 | 810 | 980 | 860 | 890 | 845 | 855 | 810 | 750 | 740 | 0 | 0 | 0 | 0 |
| s19 | 850 | 840 | 820 | 810 | 980 | 860 | 890 | 845 | 855 | 830 | 805 | 790 | 0 | 0 | 0 | 0 |
| s20 | 850 | 840 | 820 | 810 | 980 | 860 | 890 | 845 | 860 | 835 | 870 | 850 | 0 | 0 | 0 | 0 |
| s21 | 850 | 840 | 820 | 810 | 980 | 860 | 890 | 845 | 860 | 835 | 870 | 850 | 640 | 630 | 590 | 510 |
| s22 | 850 | 840 | 820 | 810 | 980 | 860 | 890 | 845 | 860 | 835 | 870 | 850 | 640 | 630 | 590 | 660 |
| s23 | 850 | 840 | 820 | 810 | 980 | 860 | 890 | 845 | 860 | 835 | 870 | 850 | 640 | 630 | 630 | 700 |
| s24 | 850 | 840 | 820 | 810 | 980 | 860 | 890 | 845 | 860 | 835 | 870 | 850 | 810 | 840 | 780 | 770 |
| s25 | 850 | 840 | 820 | 810 | 980 | 860 | 890 | 845 | 860 | 835 | 870 | 850 | 895 | 874 | 850 | 820 |

ELECTRONIC LEARNING SYSTEM

FIELD OF TECHNOLOGY

The present disclosure relates to electronic learning systems, such as adaptive and remediative electronic learning systems, and to associated methods, software and computing devices.

BACKGROUND

Electronic learning systems are systems that present a curriculum to a user (e.g. a student) for the purpose of assessing knowledge and skills and teaching the curriculum to the user. Electronic learning systems are typically computer-based. A typical curriculum consists of multiple question items. Each question item typically includes a query or instruction and a response mechanism for receiving a user response to the query or instruction. An exemplary query may be "What is the capital of New York State?" and the corresponding exemplary response mechanism may be a set of individually selectable (multiple choice) answers or an editable text field into which a user response may be typed. Alternatively, the instruction "Identify the capital of New York State" could be substituted for the above query.

When an electronic learning system presents a question item to a user, the query or instruction and response mechanism are typically displayed at the same time, e.g. on a single computer screen. The user's response may be recorded, possibly along with a measured totality of elapsed time between presentation of the question item and the entry of a user response. A user proficiency measure may be generated based on the accuracy of the user's responses.

An improved electronic learning system would be desirable.

SUMMARY

In one aspect of the present invention, there is provided a machine-readable medium storing instructions for presenting a question item of an electronic learning curriculum, said instructions, when executed by a processor of a computing device, causing said computing device to: (a) retrieve from a data store a question item comprising: textual, visual or auditory subject matter; a query or instruction pertaining to said subject matter; and a representation of a response mechanism for receiving a user response to said query or instruction; (b) present said subject matter, said query or instruction and said response mechanism in a presentation sequence, wherein a presentation duration of each of said subject matter, said query or instruction and said response mechanism in said presentation sequence is controlled by user input; (c) based on said user input, determine: a presentation duration of said subject matter; a presentation duration of said query or instruction; and a presentation duration of said response mechanism; and (d) store indicators of each of said three presentation durations.

In another aspect of the present invention, there is provided a computing device having a processor in communication with memory storing instructions for presenting a question item of an electronic learning curriculum which, when executed by said processor, cause said computing device to: (a) retrieve from a data store a question item comprising: textual, visual or auditory subject matter; a query or instruction pertaining to said subject matter; and a representation of a response mechanism for receiving a user response to said query or instruction; (b) present said subject matter, said query or instruction and said response mechanism in a presentation sequence, wherein a presentation duration of each of said subject matter, said query or instruction and said response mechanism in said presentation sequence is controlled by user input; (c) based on said user input, determine: a presentation duration of said subject matter; a presentation duration of said query or instruction; and a presentation duration of said response mechanism; and (d) store indicators of each of said three presentation durations.

In yet another aspect of the present invention, there is provided a machine-readable medium storing instructions that, when executed by a processor of a computing device, cause said computing device to: (a) calculate a user competency measure for each question item in each of a plurality of question item sets comprising an electronic learning curriculum, said calculating being based on an average response accuracy for said question item and an average completion time for said question item over a plurality of trials; (b) for each question item set of said plurality, calculate a collective user competency measure for the set based on the user competency measures of the question items of said set; and (c) automatically select for repeated presentation the question item set whose collective user competency measure is closest to but below a threshold.

DESCRIPTION OF THE DRAWINGS

Aspects and features of the disclosed embodiments will become apparent to those of ordinary skill in the art upon review of the following description of specific embodiments in conjunction with the accompanying figures. In the figures which illustrate at least one example embodiment:

FIG. 4 is a schematic diagram illustrating an exemplary question item record used by the system of FIG. 1;

FIG. 12 is a table illustrating advancement of a user from a beginner skill level to an expert skill level according to the algorithm of FIG. 11.

DETAILED DESCRIPTION

Figure 1:
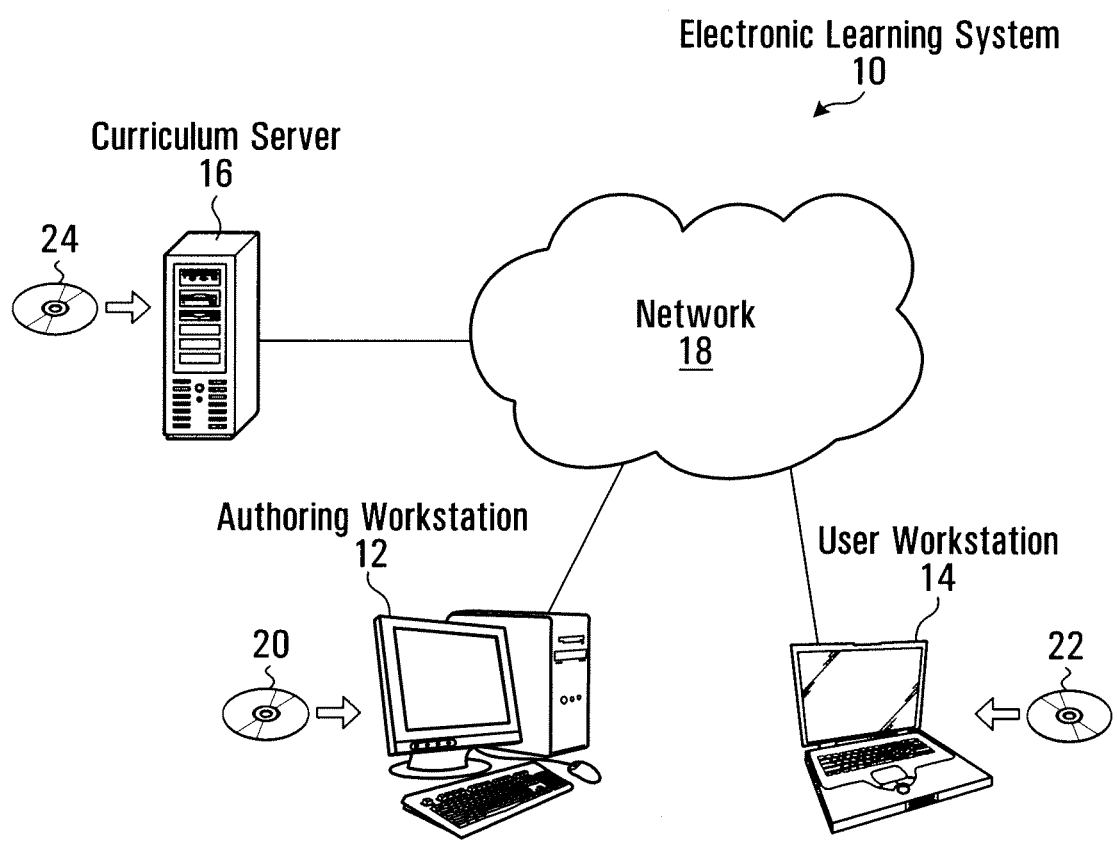
FIG. 1 is a schematic diagram illustrating an electronic learning system.

Referring to FIG. 1, an exemplary electronic learning system 10 is illustrated. The system 10 includes an authoring workstation 12 for authoring an electronic learning curriculum and a user workstation 14 for using the electronic learning curriculum. The workstations 12 and 14 each communicate with a curriculum server 16 over a network 18. During an authoring stage, an author interacts with authoring workstation 12 to create an electronic learning curriculum, which is uploaded to the curriculum server 16. During a subsequent use stage, a user (e.g. a student) interacting with user workstation 14 accesses the curriculum stored at server 16 during one or more sessions for the purpose of learning the curriculum. The authoring and use stages will be described in detail below.

Each of the authoring workstation 12 and user workstation 14 is a computing device having a display and at least one processor in communication with memory storing software in the form of processor executable instructions. The workstations 12 and 14 may for example be conventional multipurpose desktop computers, laptop computers, palmtop computers, mobile wireless communication devices or portable digital assistants, modified for operation as described herein. The term "workstation" as used herein should not be understood to connote a particular device architecture. The authoring workstation 12 is not necessarily the same type of computing device as the user workstation 14. The term "computing device" as used herein is understood to encompass any device (electronic or otherwise) capable of performing computations including, but not limited to, the devices enumerated above, and possibly including future computing device such as implants, or computer aided prosthetics. Each of the workstations 12, 14, has a network interface for communication over network 18. The software that is stored in memory at the workstations 12 or 14 may be loaded into memory from machine-readable medium 20 or 22 (respectively), which may for example be an optical disk, a form of magnetic storage medium such as a memory stick, hard disk drive, flash drive or another form of tangible storage medium capable of being read by a computing device, or received over a network from a remote source. The software at the author's workstation 12 includes a software application (possibly a web browser) by which the electronic learning curriculum is authored while the software at the user workstation 14 includes a software application (also possibly a web browser) by which the electronic learning by the curriculum is remotely accessed.

Curriculum server 16 is a computing device having at least one processor in communication with a data store (e.g. volatile or nonvolatile memory such as RAM, ROM or secondary storage) storing at least one electronic learning curriculum for remote access by users at workstation 14. In the present embodiment, the server 16 stores only one exemplary electronic learning curriculum, however it will be appreciated that many electronic learning curricula could be stored at curriculum server 16 in alternative embodiments. The curriculum server also stores software for presenting the electronic learning curriculum. This may comprise web server software that permits the electronic learning curriculum to be accessed by users at remote workstations executing web browser applications. The curriculum server software may be loaded from a machine-readable medium 24, which may for example be an optical disk, magnetic storage medium or another form of tangible storage medium capable of being read by a computing device, or received over a network from a remote source. The curriculum server 16 also has a network interface for communication over network 18.

Network 18 is a conventional data network or network of data networks. The primary role of network 18 within system 10 is to permit an author to upload the electronic learning curriculum from authoring workstation 12 to curriculum server 16 upon completion of the authoring stage and to permit a user at user workstation 14 to remotely access the electronic learning curriculum from the curriculum server 16 during the use stage. Network 18 may for example be the Internet, an intranet, or a proprietary data network.

Authoring Stage

During the authoring stage, an author creates an electronic learning curriculum made up of a plurality of question items. Each question item in the curriculum has three components that shall be presented to the user in a presentation sequence during the use stage. The first component is textual, visual or auditory subject matter, referred to as the presentation component (or "P component"). The P component may be considered to represent the subject matter of the question item, i.e. what the question item is about. The P component may comprise combinations of textual, visual and/or auditory subject matter (e.g. a video clip including text having a sound track, text with accompanying audio, etc.). The second component is a query or instruction pertaining to the subject matter, referred to as the query component (or "Q component"). The third component is a response mechanism for receiving a user response to the query or instruction, referred to as the response component (or "R component"). The R component is a mechanism for receiving a user response. These three components are not necessarily presented in the order P, Q, R.

In an exemplary question item forming part of an electronic learning curriculum for medical students, the subject matter may be an X-ray image illustrating a fractured bone; the query or instruction may be "What type of fracture is illustrated?" or "Identify the type of fracture"; and the response mechanism may be a multiple choice response mechanism providing a number of individually-selectable responses, each naming a different type of fracture, and permitting the user's response to be received (e.g. as a selection of, say, a radio button graphical user interface (GUI) element).

In overview, when creating a question item for an electronic learning curriculum, the author specifies P, Q and R components for that question item. The author also selects a display mode for the question item. The display mode determines the presentation sequence for the P, Q and R components. In the present embodiment, the order of presentation is either "P then Q then R" or "Q then P then R". In other words, the presentation sequence comprises: (i) presenting one of P and Q; then (ii) presenting the other of P and Q; then (iii) presenting R. The display of successive question item components may be either cumulative (i.e. display the succeeding component without removing the preceding component, so that both are shown together when the succeeding component appears) or consecutive (i.e. replace the preceding component with the succeeding component, so that the components are shown one at a time). Although not required in all embodiments, the display mode may also stipulate whether it is possible to review earlier displayed but no longer visible question item components (in the case of consecutively displayed question item components).

Figure 2:
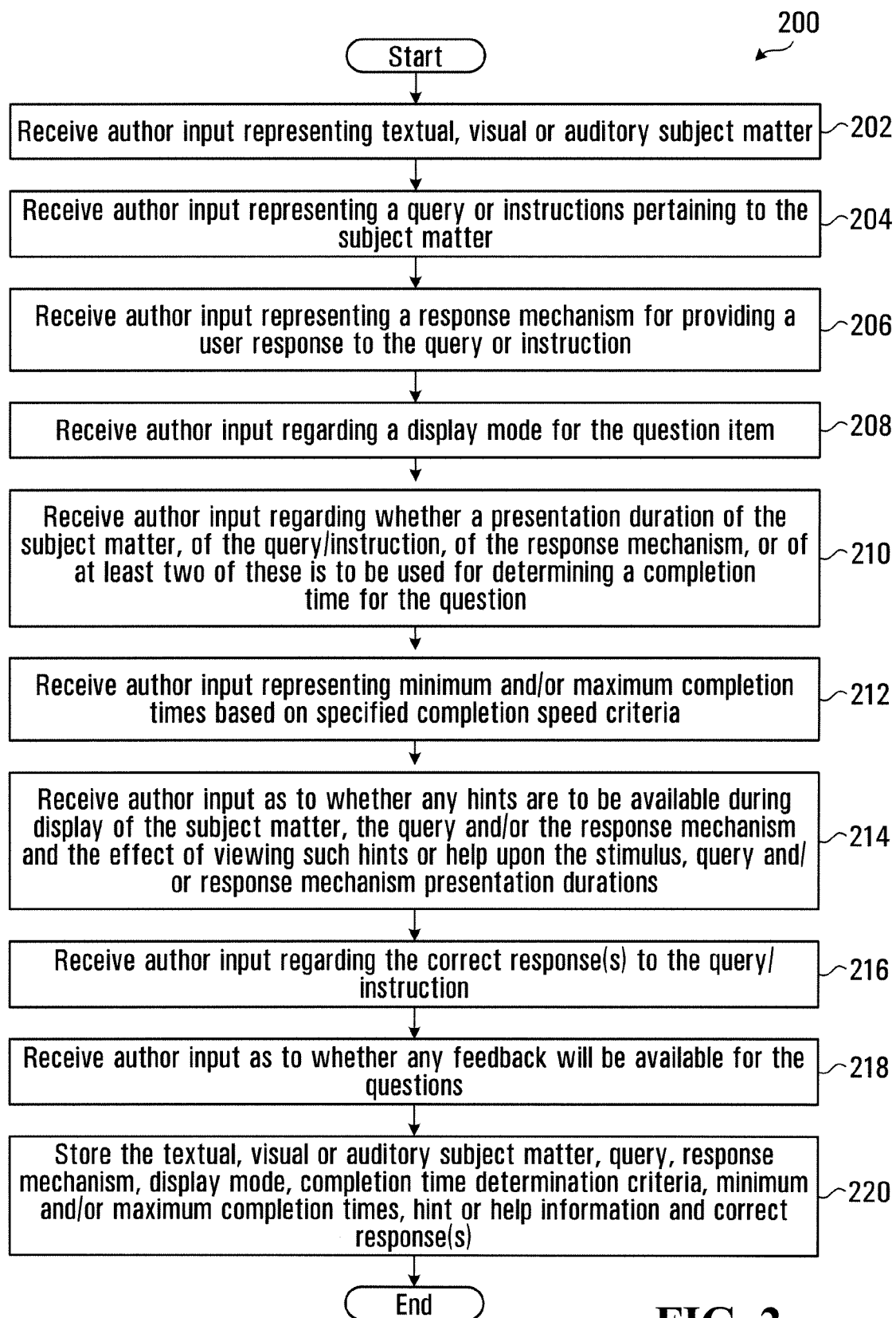
FIG. 2 is a flowchart illustrating operation for authoring a single question item using the electronic learning system of FIG. 1.

Exemplary operation 200 for authoring a single question item is shown in FIG. 2. Referring to FIG. 2, author input representing the P component, i.e. textual, visual or auditory subject matter (including combinations of textual, visual and/or auditory subject matter), is received (202). The subject matter may take various forms, including but not limited to text, an image, a video clip, an audio clip, an animation, an interactive animation (such as Adobe® Macromedia® Flash® or Microsoft® PowerPoint™), content created for a third party or commercially available application (e.g. Mathematica® or Excel®), possibly executed by way of a macro or the like. The subject matter input may be provided by the author at the authoring workstation 12 in various ways. It may be loaded from a machine-readable medium 20, received over a network from a remote source, or directly provided by the author through interaction with the authoring workstation 12, possibly by way of one or more input devices (e.g. by way of an interconnected keyboard, mouse, scanner, camcorder or the like). Alternatively, it may be identified by way of one or more links (e.g. a hyperlink to web-based content).

Next, author input representing the Q component, i.e. a query or instruction pertaining to the P component, is received (204). The query or instruction may be a textual query or instruction and, as such, it may be typed by the author using a keyboard of authoring workstation 12. Alternatively, it may be loaded from medium 20 or received over a network from a remote source, possibly in a similar fashion to the P component. The Q component could alternatively be non-textual (e.g. it could be an audio clip, video clip, or any other format in which the P component may be specified). It will be appreciated that the Q component may in some cases be an instruction, e.g. "Select one of the following four cities as the city having the largest population", and is thus not necessarily in the form of a question.

Thereafter, author input representing the R component, i.e. a response mechanism for receiving a user response, is received (206). During authoring, specification of the R component may be facilitated by authoring software that provides a graphical user interface (GUI) element at the authoring workstation 12 inviting the author to select a desired response mechanism from a list of different response mechanisms, such as: multiple choice (with either one or more than one correct answer, e.g. "choose all that apply"); true or false (a specific form of multiple choice); binary (e.g. user selection/non-selection of a single choice, such as "I accept"); fill in the blank (e.g. single word or short phrase typed into a field); multiple blank (e.g. a "fill in the blanks" questionnaire); short answer (e.g. a sentence or paragraph); essay answer (similar to short answer but possibly spanning multiple paragraphs). When "multiple choice" is selected, the author may be prompted to indicate how many foils (i.e. choices) there will be and to provide the substance of each choice (e.g. by typing the foil or, if the foils are non-textual such as graphical or auditory, by providing the appropriate input for each foil and to provide the substance of any feedback, in any format, that the user could experience upon selecting the foils). The author also provides the substance of the hints, if any, available for each component and/or for each foil.

It will be appreciated that the response mechanism may be unrelated to whatever user input mechanism may be used to receive input indicative of a user response at the user workstation 14. Various user input mechanisms may be used to interact with the response mechanism, such as pointing devices (mouse, touchscreen or trackball); keyboards (e.g. press 'Z' for yes or 'M' for no, or other keys, possibly multiple keys); audio capture of vocalized response (e.g. digital voice recording); measuring of physiological responses (e.g. heart rate, breathing rate, pupil dilation, etc., during a response interval); video capture; haptic response devices; various types of peripheral devices such as joysticks, video game controllers, inertial sensors as in the Wii™ game controller; clicker devices; combinations of these; or others.

It will be appreciated that operation 202, 204, 206 of FIG. 2 can occur in any order.

Next, the author selects a display mode for the question item which determines a presentation sequence for the P, Q and R components when the question item is presented in the use stage. In the present embodiment (although not necessarily in all embodiments), the display mode also determines whether the subject matter, the query or instruction and the response mechanism shall be displayed to a user consecutively, cumulatively or using a combination of these approaches (208, FIG. 2).

In the present embodiment (although not necessarily in all embodiments), the display mode further determines whether it is possible for a user to review earlier displayed but no longer available question item components (in the case when question item components are consecutively displayed), e.g. by selecting a "review" button to repeat the presenting of an earlier displayed component after it has been replaced by a subsequent component. In the present embodiment (although not necessarily in all embodiments), the author selects a display mode at authoring workstation 12 by selecting from one of eighteen display mode options shown in Table 1 below. Table 1 adopts a notation wherein the display mode is represented by an expression containing the letters P, Q and R (representing the presentation, query/instruction and response mechanism question item components, respectively) with a symbol between adjacent letters signifying consecutive or cumulative display of the components represented by the adjacent letters, as follows:

Consecutive display: a ":" (colon) symbol between letters signifies consecutive display of the two represented components, e.g. "P:Q" means "display P then (later) replace P with Q". In the present embodiment, the colon symbol also connotes that review of the earlier displayed component is available prior to entry of a user response (e.g. upon detection of a user input event indicating that review is desired, P shall be presented anew so as to replace Q). A "|" (vertical bar) symbol between letters is the same as a ":" symbol, i.e. it also signifies consecutive display of the two represented components, except that review of the earlier displayed component prior to entry of a user response is precluded. Depending upon the embodiment, the author may or may not have direct, question item by question item control as to whether review shall be available (e.g. in some embodiments, review may always be available to the user for all question items, or it may never be available to the user for any question item; the author may be able to specify review paths globally for the entire question item set).

Cumulative display: a "." (period or dot) symbol between letters signifies cumulative display of the two represented components, e.g. "P.Q" means "display P then (later) add Q" (i.e. without removing P).

Using this notation, eighteen display modes are possible in the present embodiment, as follows:

TABLE 1

Display Modes

| # | Notation | Meaning |
|---|---|---|
| 1. | P:Q:R | display P; then, replace P with Q; then, replace Q with R (review of P, Q available) |
| 2. | Q:P:R | display Q; then, replace Q with P; then, replace P with R (review of Q, P available) |
| 3. | P:Q\|R | display P; then, replace P with Q (review of P available); then, replace Q with R (at which time review of P, Q is unavailable) |
| 4. | Q:P\|R | display Q; then, replace Q with P (review of Q available); then, replace P with R (at which time review of P, Q is unavailable) |
| 5. | P:Q.R | display P; then, replace P with Q; add R then (review of P available) |
| 6. | Q:P.R | display Q; then, replace Q with P; add R then (review of Q available) |
| 7. | P\|Q:R | display P; then, replace P with Q; then, replace Q with R (review of only Q available) |

TABLE 1-continued

Display Modes

| # | Notation | Meaning |
|---|---|---|
| 8. | Q\|P:R | display Q; then, replace Q with P; then, replace P with R (review of only P available) |
| 9. | P\|Q\|R | display P; then, replace P with Q (review of P unavailable); then replace Q with R (review of P, Q unavailable) |
| 10. | Q\|P\|R | display Q; then, replace Q with P (review of Q unavailable); then replace P with R (review of Q, P unavailable) |
| 11. | P\|Q.R | display P; then, replace P with Q; add R then (review of P unavailable) |
| 12. | Q\|P.R | display Q; then, replace Q with P; add R then (review of Q unavailable) |
| 13. | P.Q:R | display P; then, add Q; then, replace both with R (review of P, Q available) |
| 14. | Q.P:R | display Q; then, add P; then, replace both with R (review of Q, P available) |
| 15. | P.Q\|R | display P; then, add Q; then, replace both with R (review of P, Q unavailable) |
| 16. | Q.P\|R | display Q; then, add P; then, replace both with R (review of Q, P unavailable) |
| 17. | P.Q.R | display P; then add Q; then, add R |
| 18. | P.Q.R | display Q; then add P; then, add R |

It will be appreciated that some display modes provide for the review of an earlier displayed but no longer visible question item component while others do not. Review of an earlier displayed question item component is only available when the display mode involves consecutive display of two (or more) of the P, Q and R components. The reason is that, when only cumulative display mode is used, all of the P, Q and R elements are, or will ultimately be, displayed together, obviating any need for review.

Figure 3A:
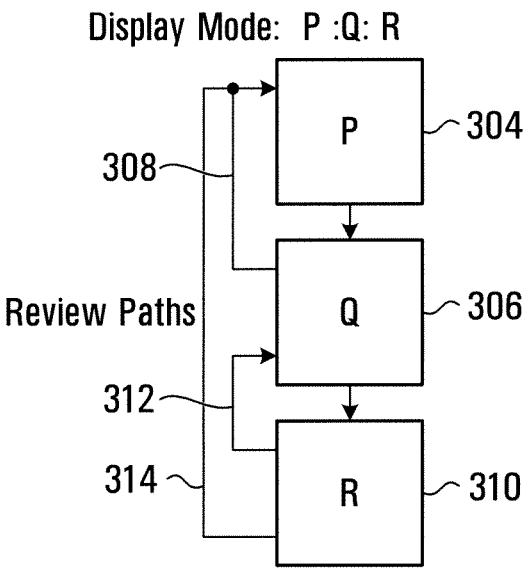
FIGS. 3A-3C are schematic diagrams illustrating three exemplary display modes for a question item.
Figure 3B:
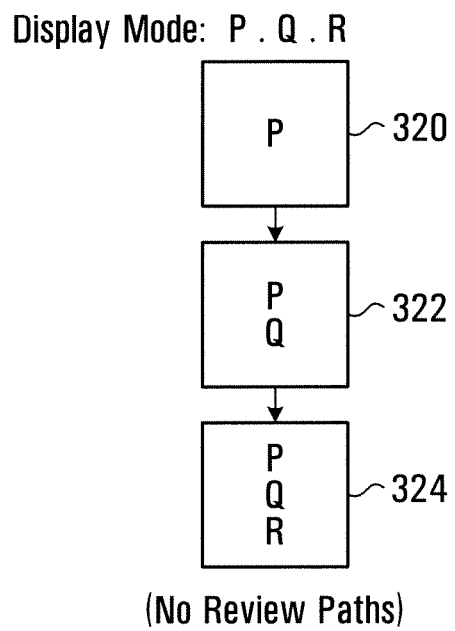
Figure 3C:
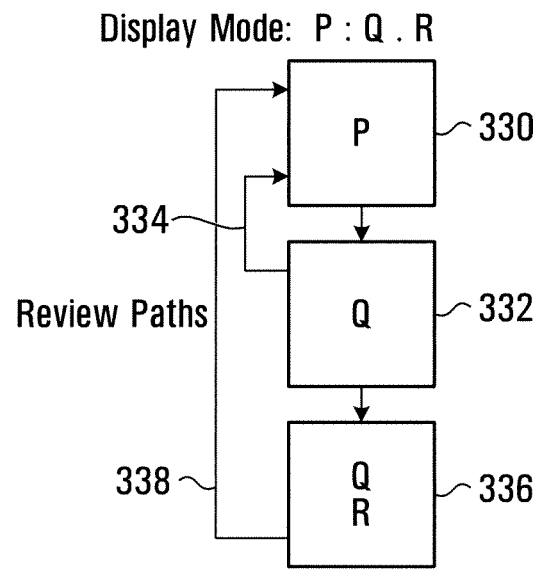

For illustration, three different display modes, two having the capacity for review of an earlier displayed question item component and one lacking this capacity, are illustrated in FIGS. 3A-3C. In these figures, each box is a symbolic representation of what a user will see on a display of user workstation 14 at a particular moment in time, with arrows between boxes illustrating user advancement through the sequential presentation of question item components.

FIG. 3A, illustrates display mode P:Q:R. Initially, only the P component is presented (box 304), e.g. on the display and/or speakers of user workstation 14 (depending whether P is visual/textual or auditory, respectively). If the P component is an audio or video clip, it may be presented with a set of controls (e.g. play, pause, rewind, fast forward, or go to beginning) that may permit the user to manipulate the audio/video, including playing it more than once or stopping it before completion. When the user advances to the next component (typically by selecting a "next" button), the Q component replaces the P component (box 306) such that the P component is no longer available on the screen for viewing/listening to (e.g. the play, pause etc. controls disappear). At this stage, the user can return to the P component via review path 308, if desired, e.g. by selecting a "Review subject matter" button. In the case of an audio/video clip, this may cause the above-described controls to reappear. Alternatively, upon further advancement, the R component replaces the Q component (box 310) such that neither of the P or Q components is available on the screen. At this stage, the user can either return to the Q component via review path 312 or return to the P component via review path 314, if desired, e.g. by selecting a "Review subject matter" button or a "Review query/instruction" button, respectively. It is noted that, if the ":" symbols in "P:Q:R" were each replaced with the "|" symbol, review paths 308, 312 and 314 would be omitted from FIG. 3A.

Turning to FIG. 3B, which illustrates display mode P.Q.R, it can be seen that when the question item is initially displayed, only the P component is presented (box 320). Upon advancement, the Q component is added to the P component, so that both are now presented together (box 322). Upon further advancement, the R component is added to the P and Q components (box 324). Because all of the P, Q and R question item components are ultimately presented together, reviewing a previously viewed question item component is meaningless for this display mode, as all of the question item components are already visible. Accordingly, no review paths are available. If either of P or Q is a video or audio clip, it may be presented with a set of controls (e.g. play, pause, rewind, fast forward, or go to beginning) that may permit the user to manipulate (e.g. replay) the audio/video even upon presentation of the R component; thus no "review path" per se is necessary.

Finally, in FIG. 3C, which illustrates display mode P:Q.R, it can be seen that when the question item is initially displayed, only the P component is presented (box 330). Upon advancement, the Q component replaces the P component (box 332). At this stage, the user can return to viewing/hearing the P component via review path 334 if desired. Assuming this is not done, upon further advancement the R component is added to the Q component (box 336), so that Q and R are displayed together. It will be appreciated that review of Q is meaningless in this situation, since Q is already displayed with R. However, the user could return to the P component via review path 338, if desired.

As a further aspect of authoring a question item in the present embodiment (although not necessarily in all embodiments), the author, who is assumed to know that the presentation duration of each of the P, Q and R question item components will be timed during use of the electronic learning curriculum (as described below), also specifies which of the P, Q and/or R component presentation durations should be used for determining a completion time for the question item (FIG. 2, 210), i.e. how long the user took to respond to the question item or to complete some aspect of the question item (e.g. viewing the P or Q component). The completion time is indicative of the user's speed of response. It will be used in computing a skill score for the question item, which is a user competency measure that is based upon average response accuracy and relative average completion time over a number of trials during which the user answered the same question item. The author thus specifies, on a per-question item basis, completion time determination criteria dictating which of the P, Q and/or R component presentation durations shall constitute the completion time that is used in the skill score calculation. If the P display duration is specified, this means that the author considers the time spent listening to and/or viewing the subject matter to be relevant to assessing user competency. If the Q display duration is specified, this means that the author considers the time spent viewing the query or instruction to be relevant to assessing user competency. If the R display duration is specified, this means that the author considers the time spent entering a response, including reading foils (for multiple choice question items), is important. The author may specify that the display duration of just one of the P, Q and R components is to form the basis of the completion time, or that a sum of the display durations of two or more components (e.g. the sum of the P, Q and R display durations) is to form the basis for the completion time.

In the present embodiment, the author further specifies the minimum completion time (CTmin) and/or maximum completion time (CTmax) for the question item (FIG. 2, 212). This information is used for the purpose of computing the skill score for the question item, in which the user's completion time over a number of trials in answering the same question item is not considered on an absolute scale, but rather is considered relative to either one or both of minimum and maximum completion times for that question item. The author may specify minimum and/or maximum completion times for each of the P, Q and R components or simply minimum and/or maximum completion times for whichever one(s) of the P, Q and R components shall contribute to the completion time, as specified above (in FIG. 2, 210).

Minimum completion time may for example be specified in any of the following ways:

(a) Manually—the author may simply set the minimum completion time to a desired value (e.g. the fastest response for an expert or the fastest possible time in which a user can physically specify the correct answer and click a "submit" button or the like)

(b) Empirically—the author may set the minimum completion time based on empirically determined values. In one example, some number of experts may be asked to answer the question item for which minimum completion time is being determined. Their average completion time and the standard deviation ($\mu$) are computed. The minimum completion time may then be set at $4\mu$ below the mean. This could vary from 0 to $5\mu$ (or more) below the mean in alternative embodiments (e.g. any score that is more than three standard deviations, i.e. $3\mu$, from the mean may be considered an "outlier" in statistical terminology, thus using $4\mu$ could be considered conservative for some embodiments). In another example, in the case where the sum of the P, Q and R presentation durations is to be used as the completion time, the minimum completion time may be set based on total number of words in the entire question item (including each of the P, Q and R components) and a typical user's reading speed. In a further example, a database of historical data for many users can be used as the basis for the minimum.

(c) Dynamically—the minimum value may be set to automatically adjust at run time based on users' performance (e.g. adjust to match a new minimum whenever a new minimum is achieved by any user), with the minimum initially being set to an arbitrary initial value. For example, durations collected from past user performances can be collected and divided into quintiles for each component of each question item. The mean and standard deviation of the best users (e.g. the top 20%) may be used to set the minimum completion time (e.g. set minimum completion time to three times that standard deviation below that mean).

Similarly, maximum completion time may for example be set in any of the following ways:

(a) Manually—set by the author to some large value that even the least experienced beginners should be able to beat (or above which there is doubt that the user was paying attention).

(b) Empirically—the author may set the maximum completion time based on empirically determined values. In one example, some number of beginners may be asked to answer the question item. Their average completion time and standard deviation ($\mu$) are computed. Then the maximum completion time may be set at $3\mu$ above the mean. This could vary from $0\mu$ to $5\mu$ (or more) above the mean in alternative embodiments. In a further example, a database of historical data for many users can be used as the basis for the maximum.

(c) Dynamically—the maximum value may be set to automatically adjust at run time based on users' performance (e.g. adjust to match a new maximum whenever a new maximum is achieved by any user), with the maximum initially being set to an arbitrary initial value. For example, durations collected from past user performances can be collected and divided into quintiles for each component of each question item. The mean and standard deviation of the worst users (e.g. the bottom 20%) may be used to set the maximum completion time (e.g. set maximum completion time to three times that standard deviation above that mean).

As yet another aspect of authoring the question item, the author may optionally also specify whether a hint or help can be viewed during electronic learning (214) and, if so, what the hint will be. Hints or help may be made available to the user during display of any of the P, Q and R components of the question item, e.g. by way of "hint" or "help" buttons (respectively) presented on the display of user workstation 14. A hint is typically a textual description that facilitates the user's comprehension of the displayed component(s) or is suggestive of a correct response. Help is typically some sort of textual description that provides basic assistance as to electronic learning curriculum functionality. Hints or help could alternatively or additionally take on forms that are not textual (e.g. graphical, cinematographic, auditory, etc.). The author may also be able to specify the effect of viewing such hints or help upon completion time (i.e. whether time spent viewing hints or help counts towards the P, Q and/or R presentation durations). In some embodiments, this behavior may not be under the author's control (e.g. it may be assumed or hard-coded that time spent viewing hints or help always counts, or never counts, towards completion time).

The author also provides input regarding the correct response(s) to the question item that is being authored (FIG. 2, 216), for use in computing an accuracy component of the skill score for the question item. In the case of a multiple choice R component, the author input may simply be an indication of which foil (i.e. which choice) is correct. In the case of a typed response (e.g. short answer or essay), the author input may be a sample response that is considered to be correct. For some question items, multiple correct responses may be entered by the author. A degree of correctness (e.g. 100%, 75%, 50% etc.) may be specified for each response.

As still another aspect of authoring the question item, the author may optionally also specify whether feedback is to be provided to the user during the use stage (218) and, if so, the substance of the feedback. Feedback may be made available automatically to the user after the user has provided a response to a question item, or e.g. by way of a "feedback" button that appears after the response has been provided, which displays feedback upon selection by the user. The author-specified feedback is typically textual and explains why a selected answer is correct or incorrect. Feedback may for example be provided for each different foil of a multiple choice question item. Time spent viewing feedback for a question item usually is recorded but does not count towards completion time for that question item, although this too may be author-controlled.

All of the above-noted author input pertaining to the question item, i.e. P, Q and R components, display mode, completion time determination criteria, minimum and/or maximum completion times, hint information, correct answer(s) and feedback, is stored in memory for each question item (220). In the result, a record for the question item (or "question item record") is created and stored within memory. If the electronic learning curriculum is being created locally at authoring workstation 12, the record will be stored in memory at the authoring workstation 12. If the electronic learning curriculum is being created at curriculum server 16 under the control of the author from authoring workstation 12, then the record will be stored at curriculum server 16. An exemplary record is illustrated in FIG. 4.

Referring to FIG. 4, it can be seen that record 400 includes a field for each of the aspects of the question item for which the author has provided input. Thus, the record 400 includes a subject matter field 402 representing the P component (which may store text, an image, a video clip, an audio clip, or virtually any other form of subject matter), a query/instruction field 404 representing the Q component, a response mechanism field 406 representing the R component, a display mode field 408 representing one of the eighteen above-described display modes for the illustrated embodiment, a completion time determination criteria field 410 storing information as to which of the P, Q and/or R presentation durations are to be used in determining completion time, a minimum and/or maximum completion times field 412, a hint information field 414 including hints for the P, Q and/or R components, a correct response(s) field 416, and a feedback information field 418. It will be appreciated that response mechanism field 406 does not necessarily store a response mechanism per se (e.g. a multiple choice response with selectable foils or an editable text field), but rather may store a representation of the response mechanism that should be presented during the use stage (e.g. a representation of each foil of a multiple choice response, an indicator that an editable text field should be displayed, etc.). Additional fields (not expressly shown) may be provided. The record 400 may for example be a conventional database record.

Additional question items are composed in the manner shown in FIG. 2. These question items are then used to create a curriculum, as shown in FIGS. 5 and 6.

Figure 5:
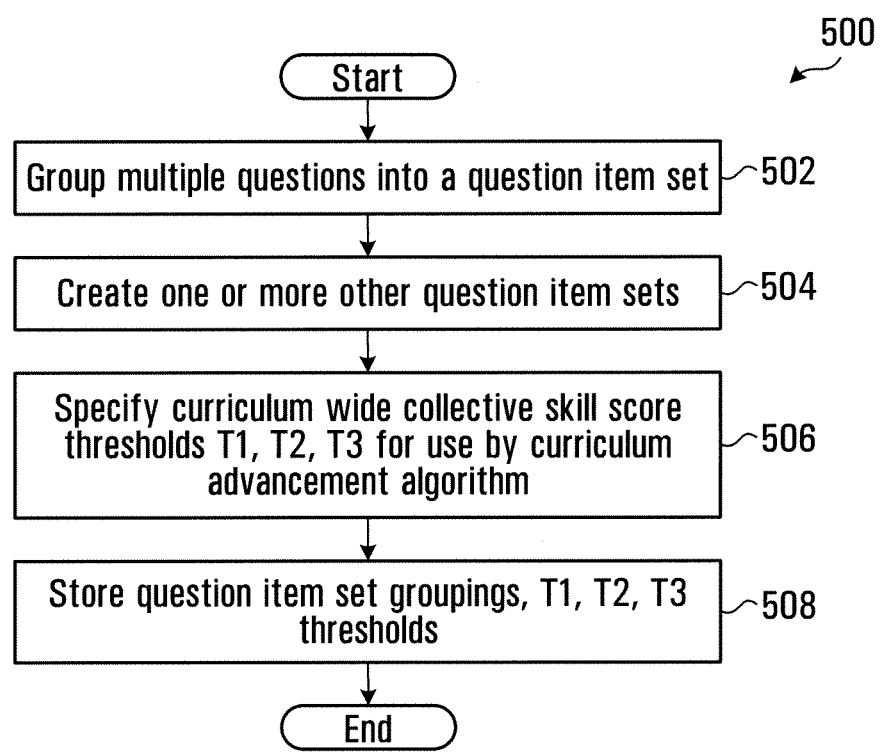
FIG. 5 is a flowchart illustrating operation for creating a curriculum using the electronic learning system of FIG. 1.

Referring to FIG. 5, operation 500 for creating a curriculum is illustrated. Initially, the author groups multiple question items into question item sets (502). A question item set is a set of question items (1 to n) that may be: (1) intended to be presented together during electronic learning in one or more sittings; (2) all related to specific topic; (3) all of a specific difficulty level; or (4) otherwise classified within the curriculum. The author repeats 502 to create one or more other question item sets (504) which collectively form the curriculum.

Figure 6:
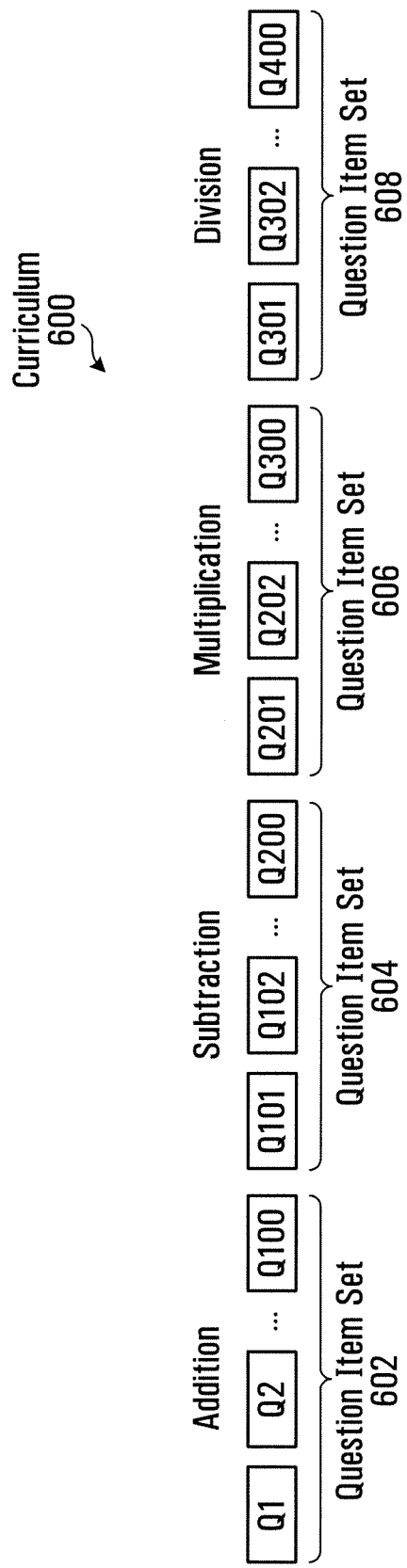
FIG. 6 is a schematic diagram illustrating question item set forming part of a curriculum created using the electronic learning system of FIG. 1.

For example, referring to FIG. 6, to create an electronic learning curriculum 600 pertaining to simple mathematics, an author may generate four question item sets 602, 604, 606 and 608 pertaining to addition, subtraction, multiplication and division, respectively. Each set may contain one hundred question items based on the one hundred different permutations of two-operand equations that are possible for single-digit operands 0-9 for the mathematical operation in question (e.g. for addition: 0+0=?; 0+1=?; . . . 0+9=?; 1+0=?; 1+1= ?; . . . 9+8=?; 9+9=?). For each question item set, the author may stipulate whether the question items should be presented sequentially or in random order during the use stage. These elections may be stored as part of the electronic learning curriculum. The number of question items in each set may vary. In some embodiments, an electronic learning curriculum may contain only one question item set.

As a further aspect of authoring a curriculum, the author specifies three different skill score thresholds T1, T2 and T3 to be used during electronic learning (FIG. 5, 506). These thresholds dictate when a user of the curriculum has reached beginner, intermediate and expert levels of competency, respectively, for a particular question item set: when a collective (e.g. average) user competency measure for the question item set meets or exceeds a threshold, that level of competency is considered to be attained. The thresholds T1-T3 may be specified on a per-set basis or curriculum-wide. The role of threshold T1, T2 and T3 will become apparent from the subsequent description of the curriculum advancement algorithm that is applied during the use stage.

All of the author-specified curriculum criteria, i.e. the groupings of question items into sets and the T1-T3 thresholds, are ultimately stored as part of the electronic learning curriculum (508).

Authoring of the curriculum is thus completed. The electronic learning curriculum may thereafter be transferred from the authoring workstation 12 to curriculum server 16, e.g. as one or more electronic files, possibly compressed for efficient transmission over network 18 or encrypted for security.

Use Stage

To use the curriculum for electronic learning, a user interacting with a user workstation 14 accesses the curriculum server 16 over network 18. Access may for example involve invocation of a web browser application at the user workstation 14, navigating to a predetermined Uniform Resource Locator (URL) where the electronic learning curriculum is posted or maintained, and entry of user account information. The user account information may permit records of any past interaction with the electronic learning curriculum (e.g. previous completion of one or more question item sets or question item sets and past skill score values) to be accessed. A desired or current question item set is identified, e.g. based upon the user's progress to date through the electronic learning curriculum (as may be apparent from a graphical "dashboard" summary of user performance to date through the curriculum that may exist in some embodiments), impending test dates, manual selection by a user or other criteria. When the user has indicated a readiness to proceed, e.g. by pressing a "begin session" user interface button or the like, the user workstation 14 communicates with the curriculum server 16 to begin displaying the question items of the current question item set, question item by question item. The question items of each set are presented either in sequential or random order, as earlier specified by the author during the authoring stage.

Figure 7:
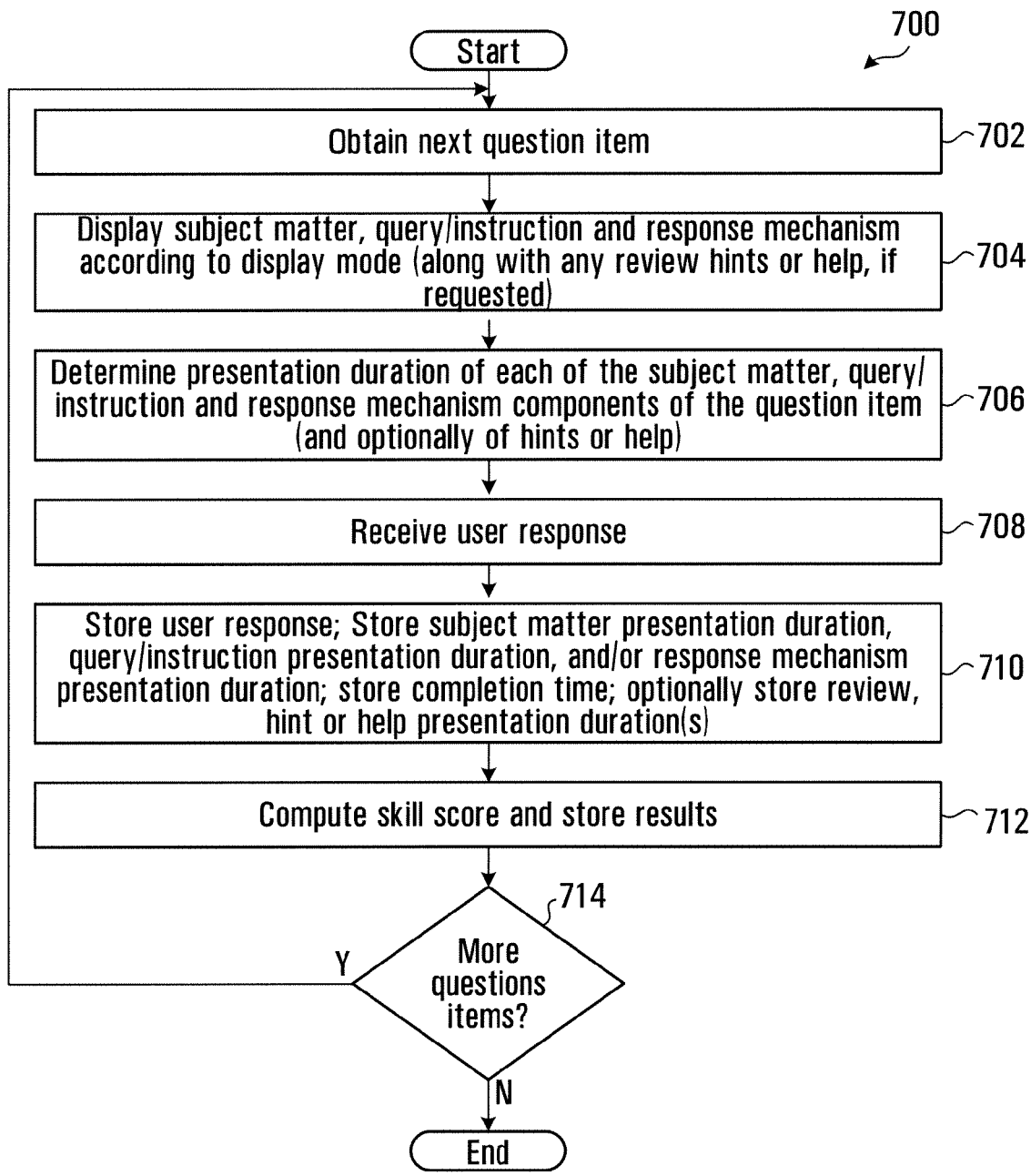
FIG. 7 is a flowchart illustrating operation for presenting the question items of a question item set.

Operation 700 for presenting the question items of a current question item set is illustrated in FIG. 7. Based on the user's progress through the curriculum to date, a next question item is obtained (702). Typically, the next question item is sequentially or randomly drawn from the question items of a current set that are as-yet unanswered. The question item is retrieved from a data store, which may comprise volatile or non-volatile memory. The P, Q and R components of the question item (i.e. the subject matter, query/instruction and response mechanism) are then presented at user workstation 14 in a presentation sequence. As earlier described, the presentation sequence for these components in the present embodiment comprises:

(i) presenting one of P and Q; then
(ii) presenting the other of P and Q; then
(iii) presenting R.

Each of (i), (ii) and (iii) may be referred to as a "stage" in the presentation sequence. The specific sequence (i.e. which of P or Q is first) determined by the display mode is specified by the author during the authoring stage (704). Any requested hints or help (if available) are also displayed.

When the display mode specifies consecutive presentation of the question item components in stages (i) and (ii) (i.e. when the display mode incorporates "P:Q", "P|Q", "Q:P" or "Q|P"), then whichever one of P or Q is presented in stage (i)

is replaced by the other of P and Q that is presented in stage (ii) upon user advancement from stage (i) to stage (ii).

For display modes permitting review of the component presented in stage (i) (i.e. incorporating "P:Q" or "Q:P"), stage (i) may later be repeated upon user request (although not necessarily for the same duration as it was originally presented). The duration of the repeated stage (i) (i.e. the duration of review) may optionally be stored separately from the initial presentation duration of stage (i), even if both durations shall contribute to (e.g. are summed for the purpose of determining) the presentation duration for the question item component that is presented in stage (i), as described below.

Similarly, when the display mode specifies consecutive presentation of the question item components in stages (ii) and (iii) (i.e. when the display mode incorporates "Q:R", "Q|R", "P:R" or "P|R"), then whichever one of P or Q is presented in stage (ii) is replaced by R upon advancement from stage (ii) to stage (iii). For display modes permitting review of the component presented in stage (ii) (i.e. incorporating "Q:R" or "P:R"), the presenting of stage (ii) may be repeated upon user request (although not necessarily for the same duration as it was originally presented). The duration of the repeated stage (ii) (i.e. the duration of review of whatever was presented in stage (ii)) may optionally be stored separately from the initial presentation duration of stage (ii), even if both durations contribute to (e.g. are summed for the purpose of determining) the presentation duration for the question item component that is presented in stage (ii), as described below.

The presentation duration of each of P, Q and R is determined by the user-controlled progression through stages (i), (ii) and (iii). Stage (i) commences with user selection of a "start" button or similar GUI control which causes the first component be presented (although, in some embodiments, the presenting of stage (i) may commence automatically, e.g. after the preceding question item is completed or, e.g. after a countdown: "Next question in 3 . . . 2 . . . 1 . . . 0 seconds". Stage (i) ends upon user selection of a "next" button or similar GUI control. Likewise, stage (ii) commences upon user selection of the "next" button and ends with user selection of another "next" button or similar GUI control. Finally, stage (iii) commences upon user selection of the second "next" button and ends upon entry of a user response. In some embodiments, entry of a user response constitutes selection of a multiple choice foil or the typing of an answer into an editable text field. In other embodiments, entry of a user response may require user selection of a "submit" button or similar GUI control after specification of a response, or possibly manipulation of an external or peripheral device described above. Based on these start and end events, the durations of stages (i), (ii) and (iii) may be measured.

As previously noted, if P and/or Q components are "temporal" in nature, e.g. are audio or video clips or animations, they may be presented with a set of controls (e.g. play, pause, rewind, fast forward, or go to beginning) that may permit the user to manipulate the audio/video, including playing it more than once or stopping it before completion, if desired.

If the user reviews P and/or Q for display modes permitting such review, then the time spent reviewing is typically added to the initial presentation duration of the relevant question item component. For example, any time spent by the user viewing/listening to the P component for the first time will certainly contribute to presentation duration of the P component, but any time spent by the user reviewing the P component after the Q and/or R component have replaced P can also, at the author's election, be deemed to contribute to the presentation duration of P. The presentation duration of review may be separately stored from the presentation duration of initial display, e.g. for possible later use in the computation of metrics pertaining to user review times. Similarly, time spent reading hints or help for a question item component may contribute to the presentation duration of that component and may be separately stored.

The manner of ascertaining the presentation durations of the P, Q and R components for a question item may depend upon the operative display mode. For example, referring to FIG. 8A, a timeline 800 showing measurement of presentation durations (here, in seconds) of P, Q and R during a user's interaction with a question item having a display mode of P|Q|R is illustrated. The actions of the user in interacting with the question item's components during their presentation are indicated above the timeline 800; the curved arrows 802, 804 and 806 represent stages (i), (ii) and (iii) of the presentation sequence, respectively.

Figure 8A:
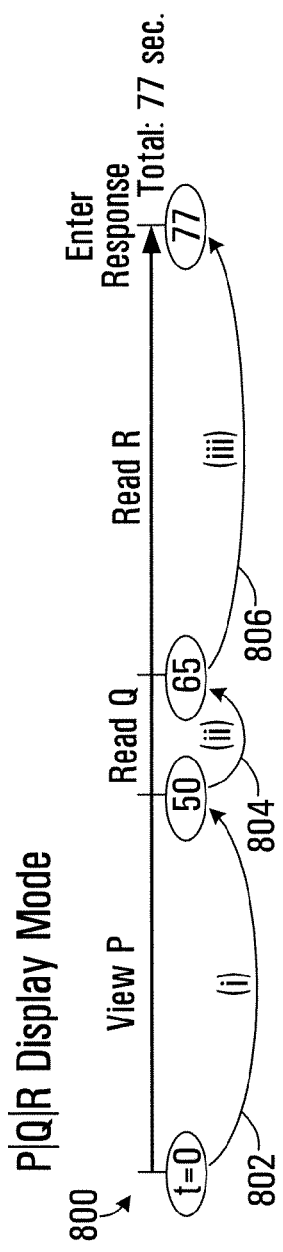
FIGS. 8A-8C are schematic diagrams illustrating user interaction with three exemplary question items, each having a different display mode.
Figure 8B:
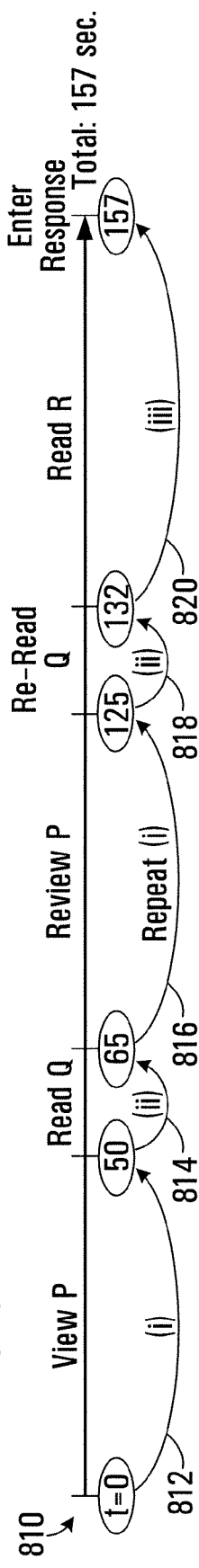
Figure 8C:
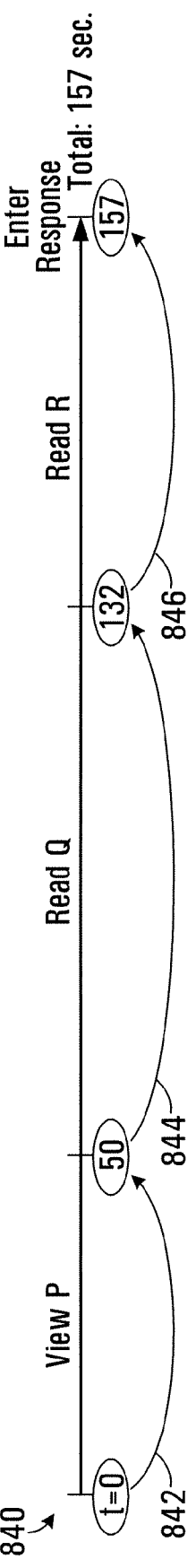

At t=0 (FIG. 8A), the first question item component (P) is presented, e.g. in response to user selection of a "start" button. From t=0 to t=50, the user views the presented P component (for this example, it is assumed that P is a textual or visual component and is thus "viewed"). At t=50, user input, e.g. selection of a "next" button, causes P to be replaced with Q. From t=50 to t=65, the user reads the Q component. At t=65, user input, e.g. selection of another "next" button, causes Q to be replaced with R. From t=65 to t=77, the user reads the foils of the R component, i.e. the possible multiple choice answers and considers which response is correct (the question items of FIGS. 8A to 8C are all assumed to have multiple choice R components). Finally, at time t=77, the user completes response entry, e.g. by pressing a "submit" button after having selected a foil. Thus, the stages (i), (ii) and (iii) represented by arrows 802, 804 and 806 correspond to the presentation durations for P, Q and R, respectively, which are therefore 50 seconds, 15 seconds and 12 seconds long.

In FIG. 8B, which adopts similar conventions to FIG. 8A, the effect of user review of the first displayed question item component (i.e. repetition of stage (i)) upon presentation duration calculation is shown. FIG. 8B may best be understood when viewed in conjunction with FIG. 3B, which illustrates the stages of displaying a question item for display mode P:Q:R. At t=0, the first question item component (P) is presented. At t=50, the user advances from the P component to the Q component (as per FIG. 3B, 309), e.g., by selecting the "next" button. At t=65, the user reverts to the P component (as per FIG. 3B, 308) e.g. by selecting a "review" button. At t=125, the user again advances to the Q component (as per FIG. 3B, 309). At t=132, the user advances to the R component (as per FIG. 3B, 313). Finally, at t=157, the user enters a response, e.g. by selecting a "submit" button or pressing "enter" after selecting a foil.

It will be appreciated that, in the example of FIG. 8B, the P component presentation duration includes both the time spent initially viewing the component and any time spent reviewing the component. Thus, the P component presentation duration is determined by summing the time intervals 812 and 816, i.e. 50 seconds plus 60 seconds, for a total of 110 seconds. The Q component presentation duration is similarly determined by summing the time intervals 814 and 818, i.e. 15 seconds plus 7 seconds, for a total of 22 seconds (the interval 818, which represents the second time Q is presented, is not considered "review" of Q per se as it merely results from the user's review of P during interval 816; thus both of intervals 814 and 818 are labeled stage (ii) in FIG. 8B). There is no review of the R component, thus the R component presentation duration simply corresponds to time interval 820 (i.e. stage (iii)), which is 25 seconds.

FIGS. 8A and 8B illustrate consecutive display of P, Q and R (the former without review and the latter with review). FIG. 8C, on the other hand, illustrates cumulative presentation of P, Q and R.

Turning to FIG. 8C, the measurement of presentation durations for P, Q and R in display mode P.Q.R is illustrated. In this display mode, the user workstation 14 detects when the user advances from the P component to the Q component (at time t=50) and from the Q component to the R component (at time t=132) as well as when entry of a response is complete (t=157). The presentation duration of the P question item component can be determined in one of two ways. The first way is to measure the totality of time that P is presented, regardless of when the subsequent question item component is later presented. Using this approach, the presentation duration for P would be the sum of the time intervals 842, 844 and 846, i.e. 157 seconds. The second way is to measure the time that P is presented until the next question item component appears (i.e. the time between the onset of the earlier-displayed question item component and the onset of the subsequent question item component, which in this example is Q). In the second approach, the presentation duration for each component reflects the time that the user's attention was likely focused upon that component.

The presentation durations of each of the P, Q and R components are determined as distinct values, and an indicator of each said distinct value (e.g. an elapsed time or one or more time stamps indicative of the presentation duration) is stored (FIG. 7, 706). This is so that, regardless of which of these components' presentation durations has been specified during authoring to comprise the completion time for the question item, if it is later desired to change the presentation duration(s) comprising the completion time, the necessary data for doing so is available (even after the user has completed electronic learning). For example, even after a question item of a set has been deemed to have been learned by a student based on the student's accurate response to that question item within an "acceptable" first completion time that was based solely on the presentation duration of R (i.e. how quickly the student entered a response), the student's user competency for that question item may later be reassessed, e.g. by an administrator of the electronic learning curriculum. This may be done by using the student's presentation duration for P, as previously stored, as the "new" significant completion time for that question item. A relative completion time for that question item and student may thereafter be determined, e.g. based on different minimum and/or maximum completion times which account for P rather than R being the significant presentation duration. Based on this "new" relative completion time and the previously stored response accuracy, a second user competency measure for the same question item could be calculated and stored, possibly in addition to the first user competency measure. The second competency measure would reflect how quickly the student viewed/listened to P, rather than how long the student took to enter a response as in the first user competency measure. In 706, the presentation duration of any displayed hints and/or help may also be determined and stored.

For accuracy, the presentation durations are measured at the user workstation 14 (e.g. using a system clock of the computing device, which is typically driven by an oscillator crystal), rather than at the curriculum server 16. This is to avoid inaccuracies which may result from such factors as network propagation delays over network 18 for example. To minimize potential inaccuracies the user workstation 14 may avoid running other concurrent applications in the background. Further, in cases where timing accuracy is critical (e.g. real-time brain scan responses or the like), the user workstation 14 could use specialized hardware and/or execute a real-time operating system to maximize timing accuracy.

It is noted that, when P comprises a recording of auditory subject matter having a fixed duration of, say, 20 seconds, the presentation duration of P may be measured in various ways. If user input for advancing to the next question item component is received prior to the complete playing of the recording (e.g. at 18 seconds), the presentation duration for P may be set to the duration that had elapsed when the user input was received (i.e. 18 seconds). If user input for advancing to the next question item component is received some time after the recording has been fully played (e.g. at 23 seconds), the presentation duration for P may be set either to the duration that had elapsed when the user input was received (i.e. 23 seconds) or to the fixed recording duration (i.e. 20 seconds). If the user has manipulated controls to cause the audio to be played twice (i.e. 40 seconds) over the course of a 45 second duration, the duration may be set to 40 or 45 seconds. Various alternatives are possible.

Whatever display mode is operative, ultimately the user provides a response to the question item using whatever response mechanism has been specified for the question item (multiple choice, fill in the blank, etc.) using some user input mechanism (e.g. mouse, keyboard, peripheral controller, etc, as described above). This response is received (FIG. 7, 708) and stored, along with indicators of the presentation durations of the P, Q and R components (710) and a computed completion time for the question item that is based on one or more of the measured presentation durations for the P, Q and R components (equal to, e.g., one of the presentation durations, a sum of two of the presentation durations, or a sum of all three of the presentation durations, as specified by the author during the authoring stage). Thereafter, a user competency measure for the question item, which is alternatively referred to herein as a skill score, is computed and stored (712). Skill score computation is based on the user's performance over a number of trials in which the same question is presented at least one, but typically more than once, and is described in greater detail below in conjunction with FIG. 9. If any unanswered question items in the set remain (FIG. 7, 714), the process is repeated.

Figure 9:
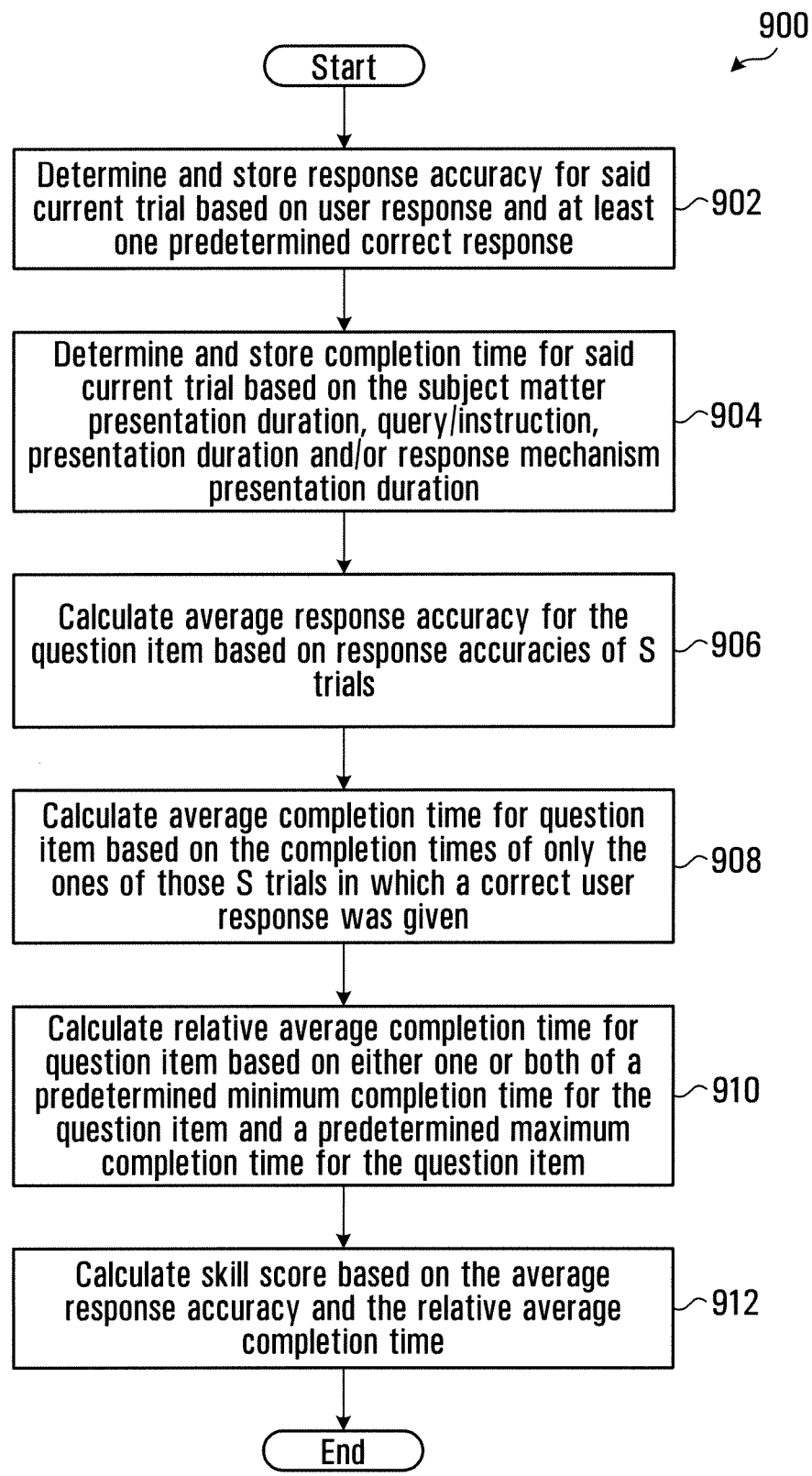
FIG. 9 is a flowchart illustrating operation for computing a user competency measure for a question item.

Operation 900 for computing a skill score for a current trial, as in block 712 of FIG. 7, is illustrated in FIG. 9. Initially, a response accuracy for the current trial is determined based on the user response and at least one predetermined correct response, and is stored (FIG. 9, 902). In the present embodiment, the response accuracy is a value in the range of zero to one (or 0% to 100%), where zero represents an incorrect user response, one represents a correct user response, and values between zero and one indicate partially correct responses.

Thereafter, a completion time for the current trial is determined (904). The completion time is based on the measured presentation duration(s) of whichever one(s) of the P, Q and/or R question item components have been specified by the author (at FIG. 2, 210) as comprising the completion time for this question item. For example, if the author had specified that the presentation duration of just the Q and R components (representing the time spent by the user in viewing the query/instruction and viewing the response mechanism/entering a response) are to be used for determining completion time for this question item, then completion time is determined in 904 by summing the user's measured Q and R presentation durations, with any time spent reviewing the Q component (if applicable) or reviewing hints or help for either of the Q or R components (if applicable) optionally forming part of the presentation durations for these question item components, at the author's discretion.

Next, an average response accuracy (RAavg) for the question item is determined based on the response accuracies S trials in which the same question item has been presented to the user (FIG. 9, 906), where S is a positive integer. The average response accuracy thus takes into account the user's accuracy in answering the same question item over a window of S attempts.

In the present embodiment, the calculation of an average response accuracy entails calculating a weighted average of S stored response accuracies. In other words, it is presumed that the user has been presented with the same question item S times, and each time the user's response and completion time was stored for later use in computing the skill score for that question item. For example, TABLE 2 below represents stores data associated with the five trials of responding to an exemplary question item, i.e. question item 1.

In TABLE 2, each trial for question item 1 is represented by a table row. The first row represents the least recent trial and the last row represents the most recent trial. The values in the second column indicate the correctness of the user response for each trial. The response accuracies in the third column are equal to one for a correct response and zero for an incorrect response. The weights in column four represent the relative weight of each response and completion time for the trial represented by the row in relation to the trials represented by other rows. The values in column five represent the completion times for each trial.

TABLE 2

S Trials of Completing Question Item 1 (S = 5)

| TRIAL NO. | CORRECT? | RESPONSE ACCURACY | WEIGHT | COMPLETION TIME |
|---|---|---|---|---|
| 1 | Yes | 1 | 1 | 3.4 seconds |
| 2 | No | 0 | 2 | 1.1 seconds |
| 3 | Yes | 1 | 3 | 3.0 seconds |
| 4 | Yes | 1 | 4 | 2.6 seconds |
| 5 | No | 0 | 5 | 5.6 seconds |

In the present embodiment, the calculation of an average response accuracy for a question item comprises calculating a weighted average. More specifically, each response accuracy (column 3) is weighted by its corresponding weight (column 4) and the resulting weighted accuracies are summed. For the data of TABLE 2 above, this would entail performing the following calculation: 1*1+0*2+1*3+1*4+0*5=8. This sum of weighted accuracies is then divided by a sum of weighted accuracies that would result for S correct responses, i.e. 1*1+1*2+1*3+1*4+1*5=15. The resulting average response accuracy is 8/15 or 0.533.

In some embodiments, the average response accuracy may be a straight (i.e. non-weighted) average of actual response accuracies in relation to the accuracies that would result for S correct responses, i.e. (1+0+1+1+0)/(1+1+1+1+1) or 0.600. It is understood that the term "average" as used herein may encompass other types of calculations for assessing a representative measure of completion time based on S trials, such as calculating a median.

Subsequently, an average completion time (CTavg) for the question item is determined based on the completion times of only the ones of those S trials in which a correct user response was given (FIG. 9, 908). The average completion time of the present embodiment is computed as a weighted average. More specifically, each completion time (column 5) for a trial in which a correct response was given (i.e. for rows 1, 3 and 4 but not rows 2 or 5) is weighted by its corresponding weight (column 4), and the resulting weighted completion times are summed. For the data of TABLE 2 above, this would entail performing the following calculation: 3.4 sec*1+3.0 sec*3+2.6 sec*4=22.8 seconds. This sum is then divided by a sum of the weights for the trials in which a correct response was given, i.e. 1+3+4=8. The resulting average completion time is 22.8 seconds/8 or 2.85 seconds.

In some embodiments, the average completion time may be a straight average of the completion times of the last S attempts for which correct responses were given, i.e. (3.4 sec+3.0 sec+2.6 sec)/3 or 3.00 seconds. It is understood that the term "average" as used herein may encompass other types of calculations for assessing a representative measure of completion time based on S trials, such as calculating a median.

Thereafter, a relative average completion time (CTrelavg) for the current trial is calculated (FIG. 9, 910). This essentially involves comparing the average completion time (CTavg) computed above to the minimum completion time (CTmin) and/or maximum completion time (CTmax) for the question item, as specified by the author during the authoring stage. In the present embodiment, relative completion time is calculated based on both CTmin and CTmax, according to equation (I) below:

$$CTrelavg = ((CTmax - CTavg)/(CTmax - CTmin))^p$$

That is, the difference between the maximum completion time and the average completion time, as determined in block 908, is divided by the difference between the maximum and minimum completion times, and the resulting value is exponentiated, i.e. raised to an exponent p, where p is a number greater than zero. The exponent serves to differentially weight speed improvements as the user gets faster with training. When p is greater than one, the choice of a value for the exponent p allows the author to selectively weight those times that are closer to CTmin more heavily than those that are closer to CTmax. The larger the exponent, the heavier the weighting. For example, as between two embodiments in which p=3 and p=5 respectively, the latter would require a user to get much closer to the minimum completion time (i.e. expert speed) before increase in speed is evidenced in user competency measure improvements. When p is between 0 and 1, on the other hand, improvements near CTmax (i.e. beginner speeds) are weighted more heavily than those near CTmin. The value of CTrelavg resulting from the exponentiation ranges from zero to one in the present embodiment, with zero representing a user completion time equal to the maximum response time and one representing a user completion time equal to the minimum response time. Thus, the faster the user's completion time, the greater the relative completion time value as computed by equation (I).

When the average completion time is smaller than the minimum completion time it may be increased to match the minimum completion time. Similarly, when average completion time is larger than the maximum completion time, it may be reduced to match the maximum completion time. This may avoid negative values in the base of the exponent for equations above which could result in undesirable negative CTrelavg values for certain values of P.

In equation (I) above, relative average completion time is based on the average completion time as well as both of the author-specified minimum and maximum completion times CTmin and CTmax. In alternative embodiments, the relative average completion time may be based on the average completion time and only one or the other (not both) of CTmin and CTmax. Two alternative equations (I') and (I") for calculating relative completion time in such a fashion are provided below.

$$CTrelavg = (CTmin/CTavg)\hat{\ }p \qquad (I')$$

$$CTrelavg = (1-(CTavg/CTmax))\hat{\ }p \qquad (I'')$$

In some embodiments, the equation that is used to convert completion time to a number from 0 to 1 may differ from equations (I), (I') and (I") above. For instance, in some embodiments, it may be acceptable for the function to be linear rather than exponential. The conversion could also by done by one or more tables.

Thereafter, an overall skill score for the current trial is computed (FIG. 9, 912). In the present embodiment, this is achieved by way of equation (II), as specified below:

$$\text{Skill Score} = RAavg * C1 + CTrelavg * C2 = X + Y \qquad (II)$$

In equation (II), the average response accuracy is scaled by a constant C1 (i.e. scalar C1) and relative average completion time is scaled by a constant C2 (i.e. scalar C2). The scaled results may be referred to as the "X" and "Y" components of the skill score, respectively. The X and Y values are summed to yield the overall skill score. Scaling the accuracy and relative completion time values may have two benefits. Firstly, it may give the score greater relevance to a typical user. For example, the skill score of the present embodiment ranges between zero (for a completely incorrect response answered in the maximum amount of time) and two (for a 100% correct response answered in the minimum amount of time). However, by choosing constants C1 and C2 that sum to 1000 (in which case a perfect skill score would be 1000), the skill score may be made resonate with certain users as comparable to a baseball batting average. Secondly, scaling may allow the relative importance of accuracy versus relative completion time to be set by the author. For example, by setting C1 to 900 and C2 to 100, the skill score may be weighted much more heavily towards accuracy of response than towards speed of response. Any desired weighting may thus be attained by the author. Once computed, the skill score is stored (910).

Figure 10:
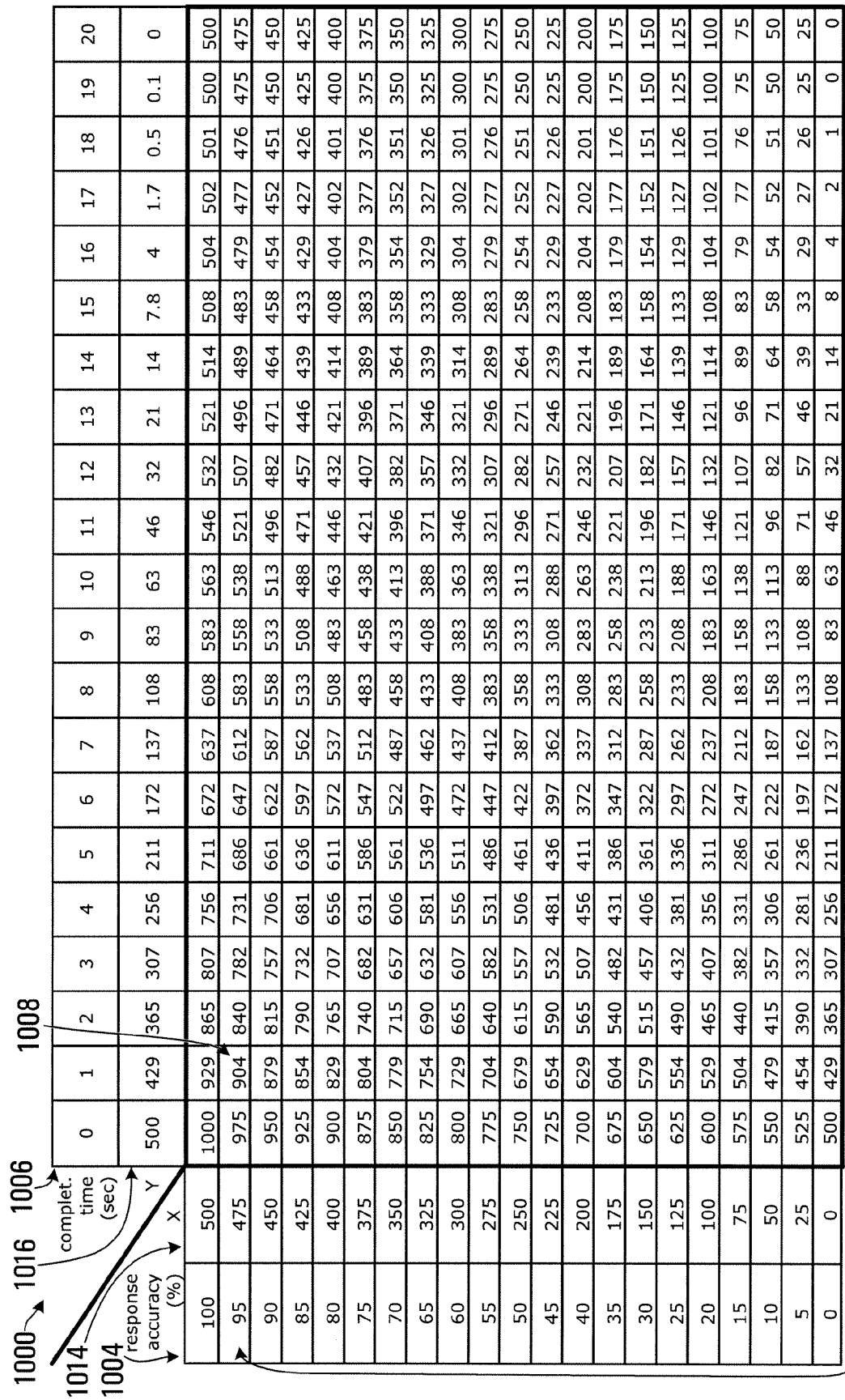
FIG. 10 is a table illustrating exemplary user competency measures as may be computed by the system of FIG. 1.

FIG. 10 contains a table 1000 illustrating exemplary skill scores as may be computed by equation (II) above for various user response accuracy and completion time scenarios. The table 1000 includes a body 1002 of four hundred twenty cells (twenty one rows by twenty columns). Each cell within the body 1002 contains a skill score that would result, based on equation (II), for a unique user response accuracy and completion time scenario, with exemplary C1 and C2 values of 500 being assumed.

In FIG. 10, the average response accuracy associated with a particular cell is indicated in column 1004, in the row occupied by that cell. Similarly, average completion time associated with a particular cell is indicated in row 1006, in the column occupied by that cell. For example, cell 1008 within body 1002 represent the skill score that results when the user responds 95% accurately (1010) with an average completion time of 1 second (1012).

Column 1004 contains response accuracies ranging from 100% to 0%, at 5% intervals. The corresponding X values that would be generated according to equation II (i.e. average response accuracy scaled by the exemplary C1 value of 500) are shown in column 1014. Row 1006 shows completion times ranging from 0 seconds (the minimum completion time) to 20 seconds (the maximum completion time) at one second intervals. The corresponding Y values that would be generated according to equation II (i.e. relative average completion time scaled by the exemplary C2 value of 500) are shown in column 1016. It will be appreciated that the skill score value in any cell of body 1002 represents the sum of the X value from column 1014 in the column occupied by that cell and the Y value from row 1016 in the column occupied by that cell. A perfect skill score of 1000 (100% correct response in the minimum time of zero seconds) is shown in the upper left hand corner of body 1002, while a minimum skill score of 0 (0% correct response in the maximum time of twenty seconds) is shown in the lower right hand corner of body 1002.

As earlier described, operation 700 of FIG. 7 represents a single pass by a user through a set of question items. However, it will be appreciated that multiple passes may be required in order for a user to be considered to have truly learned the curriculum. To guide the user from being a beginner to being an expert in a particular curriculum, a curriculum advancement algorithm is applied. This algorithm is exemplified by operation 1100 of FIG. 11.

Figure 11:
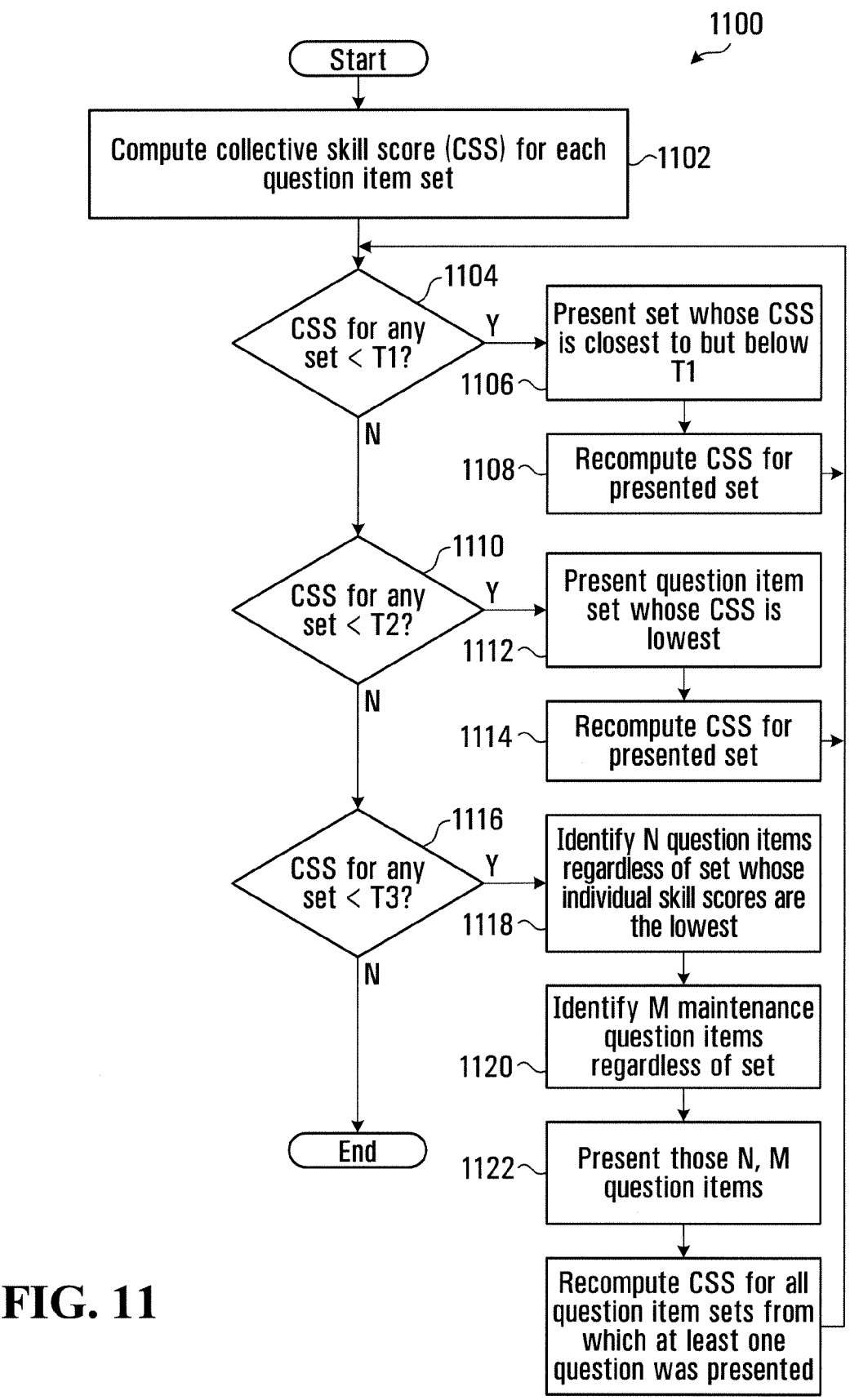
FIG. 11 is a flowchart illustrating an exemplary curriculum advancement algorithm used by the system of FIG. 1.

Referring to FIG. 11, operation 1100 illustrates an exemplary algorithm for advancement of a user from a beginner skill level to an expert skill level for an exemplary electronic learning curriculum comprising multiple question item sets. Initially, a collective user competency measure, referred to herein as a collective skill score (CSS), is computed for each question item set within the curriculum (1102). A CSS is a value that reflects the user's competency across multiple question items. A CSS is typically computed by averaging the skill scores for all of the question items of the set. In some embodiments, calculating the CSS may involve combining the average skill score for the set (based on the user's most recent pass through the set) with one or more previously computed average skill scores for the set (based on the user's prior pass(es) through the set). Combining may entail weighting the most recent average more heavily that the previously computed average(s). Some embodiments could average the sets' speeds and accuracies separately.

If a question item set has not yet been presented to the user in accordance with operation 700 of FIG. 7, then the CSS may initially have a default value of zero.

The collective skill scores computed for each question item set are then used to determine what set to present next. If the collective skill score for any set of the question item set is below a first threshold T1 (1104), where T1 is a threshold CSS value representing a "beginner" skill level, the set having the collective skill score closest to but below T1 is presented next (1106). The rationale for this approach, which may be referred to as the "race up" approach, is to prioritize question item sets whose collective skill are the highest but are not yet at threshold T1, so that each set has a baseline of exposure before more stringent thresholds must be met. In this case the user has at least a beginner level of competence in all of the sets before advancing further. The race up approach emphasizes breadth over depth. Once the question item set has been presented (1106), the CSS for the set is recomputed (1108). Assuming that the number of correct responses and/or completion times are better in this pass than they were during the user's last pass through the question item set, the CSS value will improve, possibly meeting or exceeding the threshold CSS value T1.

Operation then repeats from 1104. It will be appreciated that, if the CSS value for the presented set has not yet met or exceeded T1, it may be presented again (assuming that its CSS remains the CSS value that is closest to but below T1) upon repetition of 1106.

Ultimately, when the CSS values for each question item set meets or exceeds the threshold CSS value T1, the user is considered to have attained a "beginner" skill level for the question item set as a whole. Operation then advances to 1110.

At 1110, if the collective skill score for any question item set is below a second threshold CSS value T2, where T2 is a threshold CSS value representative of an "intermediate" skill level, the set having the lowest collective skill score of all sets in the question item set is presented next (1112). The rationale for this approach, which may be referred to as the "bubble up" approach (since, as the set with the lowest CSS improves and exceeds another set's CSS, its CSS will not improve further until the set with the new lowest CSS improves and exceeds another set's CSS), is to prioritize question item sets whose collective skill are the lowest despite being at least T1. The rationale is to ensure that all sets are learned at a predetermined level before attention is given to the weakest items across the sets. Once the question item set has been presented (1112), the CSS for the set is recomputed (1114). Assuming that the number of correct responses and/or completion times are better than they were during the user's last pass through the question item set, the CSS value will improve, possibly meeting or exceeding the threshold CSS value T2. Bubble up may suit learning environments in which a user may alternate learning among many sets, possibly allowing the user to perceive interconnections and relations among question items across the set topic context.

Operation then repeats from 1104. The reason that operation repeats from 1104 rather than from 1110 is to account for the possibility that the CSS for a question item set which previously met or exceeded T1 could drop below T1, requiring operation at 1106-1108 to be repeated.

Upon repetition of 1112, it will be appreciated that, if the CSS value for a previously presented set has not yet met or exceeded T2, it may be presented again (assuming that its CSS remains the lowest CSS value of all sets in the curriculum while still exceeding T1). Ultimately, when the CSS values for each question item set meets or exceeds the threshold CSS value T2, the user is considered to have attained an "intermediate" skill level for the curriculum as a whole. Operation advances to 1116.

At this stage, individual question items whose skill scores are the weakest (regardless of set) are presented, along with some "maintenance question items" (i.e. randomly selected question items being repeated simply to maintain an existing level of user competency) mixed in, until a third threshold T3 is reached for each set, where T3 is a CSS value representative of an "expert" skill level. The curriculum is then considered to have been learned. To promote revisiting of all question items, the maintenance question items could be chosen based on date last tested, with the least recent being chosen first. The oldest items are more likely to be forgotten and therefore should be randomly sampled more often.

More specifically, at 1116, if the collective skill score for any question item set is below the third threshold value T3, N individual question items (where N is a positive integer) whose skill scores are the lowest are identified (1118). The N question items are selected regardless of whether they belong to a set whose CSS is less than T3 or greater than or equal to T3. The rationale for this approach is to focus on question items for which the user has demonstrated the least user competency, with any improvements in user competency for those question items resulting in an improvement in user competency for the question item sets to which they belong. M maintenance question items (where M is a positive integer different from or the same as N) are also selected (1120). The N question items identified in 1118 are then presented along with the M question items selected in 1120 (1122). When this has been done, the CSS for all sets from which at least one of the N or M question items was drawn is recomputed (1124).

Operation then repeats from 1104. The reason that operation repeats from 1104 rather than from 1116 is to account for the possibility that the CSS for a question item set which previously met or exceeded T1 could theoretically drop below T1 or T2, requiring operation at 1106-1108 or 1112-1114 to be repeated.

Ultimately, when the CSS values for each question item set meets or exceeds the threshold value T3, the user is considered to have attained an "expert" skill level for the curriculum as a whole. Operation 1100 is thus completed.

FIG. 12 contains a table 1200 illustrating advancement of a user from a beginner skill level to an expert skill level according to algorithm 1100. In FIG. 12, advancement is shown for four exemplary electronic learning curricula 1-4, each comprising four question item sets (1a-1d, 2a-2d, 3a-3d, and 4a-4d, respectively). Each row in the table 1200 represents a distinct user session at user workstation 14, while each column in the table represents a question item set. A session is a single work period in which the user completes one or more sets of question items. It may be alternatively be thought of as the work accomplished in a single login period. The user's progress from an initial session s0 to a final session s25 is shown, with the algorithm illustrated in FIG. 11 being applied once for each of the electronic curricula, in sequence.

Each cell within table 1200 contains a collective skill score (CSS) value for the relevant question item set indicated by the containing column at the completion of the relevant session indicated by the containing row. In table 1200, cells containing a bolded CSS value indicate that the CSS value has changed from the previous session above. For the purposes of FIG. 12, it is assumed that T1=400, T2=600 and T3=800.

Beginning with session s0, which represents an initial assessment of the user's competency, collective skill score values of 0 are set for each of the sixteen question item sets, reflecting an initial assumption of a complete lack of user competency in the relevant curricula.

Beginning with curriculum 1, in a first session s1, the user completes each of the four contained question item sets 1a-1d once, with the resulting CSS values for each question item set being shown in bold in the relevant row of table 1200. In view of the fact that the resulting CSS values exceed threshold T2 for each set 1a-1d but are less than T3 for at least one of the sets, operation 1100 proceeds directly to 1116 (FIG. 11) in the next session s2. In this example, it is assumed that the N weakest question items and M maintenance question items are drawn from each of the four sets 1a-1d. When operation 1118 to 1124 of FIG. 11 is performed, the CSS for three of the four question item sets increase. However, because they remain below threshold T3, operation 1116 to 1124 is repeated in session s3. In this pass, all of the CSS values exceed T3, and the first curriculum is therefore considered to have been learned.

Turning to curriculum 2, in session s4 the user completes each of the four contained question item sets 2a-2d once, with the resulting CSS values for each question item set being shown in bold in the relevant row. In view of the fact the resulting CSS values for sets 2c and 2d are below threshold T1, operation 1100 proceeds to 1106 in the next session s5. Set 2c is identified as the set whose CSS is closest to but below T1, so it is presented (1106) and its CSS recomputed (1108)

to a value 410, which exceeds T1. Accordingly, in the next session s6, the only set 2d whose CSS remains below T1 is presented (1106) and its CSS recomputed (1108) to a value 480.

Now that that the CSS values for all sets 2a-2d exceeds T1, operation proceeds to 1110. Because set 2c has the lowest CSS value of 410, it is presented (1112) and its CSS recomputed (1114) to a value 590 in session s7. Because set 2d now has the lowest CSS value of 480, it is presented (1112) next and its CSS recomputed (1114) to a value 630 in session s8. Operation 1110-1112 is repeated for set 2c in session s9, given that it is the only remaining set with a CSS below T2. The resulting CSS of 670 exceeds T2.

At this stage operation 1116-1124 is repeated three times in sessions s10 to s12, until all of the CSS values exceed T3. At that stage, the second curriculum is considered to have been learned.

From the foregoing, it will be apparent that the same approach is used for advancing curriculum 3 from beginner through to expert level in sessions s13 to s20 and for advancing curriculum 4 from beginner through to expert level in sessions s21 to s25.

As will be appreciated by those skilled in the art, various modifications can be made to the above-described embodiments. For example, in the above description, the curriculum advancement algorithm is applied question item set by question item set, wherein the sets form part of an electronic learning curriculum. It will be appreciated that the curriculum advancement algorithm could be applied to any plurality of question items. For example, question item sets could be subdivided in to subsets, and the algorithm could be applied subset by subset.

It will also be appreciated that the operation illustrated in FIG. 11 at 1106-1108 (the "race up" approach) could be swapped for the operation described at 1112-1114 (the "bubble up" approach) in some embodiments. Alternatively, in some embodiments any of the "race up", "bubble up" and "mastery" approaches could be applied entirely independently of the others. Such embodiments may have only one operative CSS threshold.

In some embodiments, the "mastery" approach illustrated at 1118-1124 of FIG. 11 may be applied on a per-set basis, e.g. when a particular set's CSS has exceeded T2 but is still below T3, rather than across an electronic learning curriculum only when the CSS for all sets has exceeded T2. In that case, the pool of question items from which question items are drawn may be limited to that set.

In some embodiments, the threshold values T1, T2 and/or T3 used during operation 1100 may be dynamically adjustable between iterations of the curriculum advancement algorithm. For example, once the user has advanced to an expert level based on initial threshold values of, say, T1=400, T2=600 and T3=800, the user may be required to repeat operation 1100 with T1=500, T2=750 and T3=950. Alternatively, the higher threshold values may be set prior to user completion of operation 1100, based on a favorable initial assessment of user competency for example.

In some embodiments, after completion of operation 1100 for two (or more) question item sets, the sets may be combined to create a new, larger set, and operation 1100 may be repeated for that new set, possibly with higher threshold values.

To expedite operation 1100, the CSS for a question item set may be recomputed after each question item is completed, rather than just after all question items have been completed (as at 1108, 1114 and 1124 of FIG. 11), with the user being permitted to advance to the next competency level or complete the question item set immediately upon meeting or exceeding the operative CSS threshold for the current competency level. This may avoid user frustration in having to repeat all of the question items of a set every time the set is presented.

In some embodiments, the software application by which the electronic learning curriculum is authored at the workstation 12 may simply be a web browser application which presents authoring software that is actually hosted by a web server comprising curriculum server 16. In such embodiments, although authoring of the electronic learning curriculum is still controlled by the author, the actual curriculum may be created at the curriculum server 16 based on remote author instructions from authoring workstation 12. In that case, uploading of the curriculum after the authoring stage may be unnecessary, since the curriculum may already be situated at the curriculum server 16, within a data store.

It will be appreciated that implementation of any aspect of the above-described system in "software" could be effected in firmware or hardware, or using combination of software, firmware and/or hardware.

In some embodiments, a user of an electronic learning curriculum may be able to revisit a previously answered question item within a set of question items, e.g., through selection.

The response accuracy for computing a skill score will usually be 0 or 1 on a single trial (unless partial credit marks are specified by the author as being available), but as question item sets are repeated the accuracy component can effectively become a weighted average of the last n trials in some embodiments. In such embodiments, values between 0% and 100% represent partially leaned items. For example, responding correctly on the last time may be worth a weight of 4, on the second to last time may be worth a weight of 3, third to last time may be worth a weight of 2, and fourth to last may be worth a weight of 1. This is based on memory phenomena such as recency and forgetting.

In some embodiments, the X and Y components of equation (II) may be combined in ways other than summing. The skill score could also be a family of functions or tables, weighting the accuracy and speed components, e.g. user competency measure=accuracy*speed*1000. In one embodiment, historical data is averaged over the last n trials (where n is an integer, typically 4 to 10).

The number of display modes may vary in alternative embodiments. Some embodiments may not have display modes per se. For example, a fixed presentation sequence (e.g. P, Q, R) may be used for all question items.

In some embodiments, the number of thresholds used in a curriculum advancement algorithm may be less than or greater than three.

It should be appreciated that the software for authoring or using an electronic learning curriculum can be deployed in numerous ways. In one embodiment, a "Software as a Service" (SaaS) model is used, in which both workstations 12 and 14 may use a web browser or other application having a GUI for accessing and using software stored in the memory of the curriculum server 16. In this approach, neither of workstations 12 or 14 has any dedicated software installed on the local hard drive per se. Alternatively, a dedicated authoring application may be installed on workstation 12. A curriculum generated by such an application may be stored at server 16 and downloaded to the workstation 14 upon user request. There, the curriculum could be executed by a dedicated local application for presenting the curriculum.

In some embodiments, question items can include instructions, facts to be memorized, and non-evaluative material such as demographic data from surveys that have no correct answer. For some question items, there may be no "correct answer".

Other modifications will be apparent to those skilled in the art and, therefore, the invention is defined in the claims.

What is claimed is:

1. A non-transitory machine-readable medium storing instructions for presenting a question item of an electronic learning curriculum, said instructions, when executed by a processor of a computing device, causing said computing device to:
    (a) retrieve from a data store a question item comprising:
        textual, visual or auditory subject matter;
        a query or instruction pertaining to said subject matter; and
        a representation of a response mechanism for receiving a user response to said query or instruction;
    (b) present said subject matter, said query or instruction and said response mechanism in a presentation sequence, wherein a presentation duration of each of said subject matter, said query or instruction and said response mechanism in said presentation sequence is controlled by, and is measured on the basis of, user input for advancing through the presentation sequence;
    (c) based on said user input, determine:
        a presentation duration of said subject matter by measuring a duration of display of the subject matter;
        a presentation duration of said query or instruction by measuring a duration of display of the query or instruction; and
        a presentation duration of said response mechanism by measuring a duration of display of the response mechanism;
    (d) store indicators of each of said three presentation durations;
    (e) receive a user response to said query or instruction via said response mechanism;
    (f) ascertain a response accuracy based on said response and at least one predetermined correct response;
    (g) determine a completion time for said question item based on one or more of said presentation duration of said subject matter, said presentation duration of said query or instruction and said presentation duration of said response mechanism; and
    (h) store said response accuracy and said completion time for said current trial,
    wherein said instructions cause said computing device to present said question item S times by performing (b)-(h) for each of S trials, S being an integer greater than one, and to:
    (i) calculate an average response accuracy for said question item based on the stored response accuracies of said S trials;
    (j) calculate an average completion time for said question item based on the stored completion times of only the ones of said S trials in which a correct user response was given;
    (k) calculate a relative average completion time for said question item based on said average completion time and either one or both of a predetermined minimum completion time for said question item and a predetermined maximum completion time for said question item; and
    (l) calculate a user competency measure for said question item based on said average response accuracy and said relative average completion time.

2. The machine-readable medium of claim 1 wherein said calculating said average response accuracy comprises calculating a weighted average of the S stored response accuracies by weighting stored response accuracies of more recent trials more heavily than stored response accuracies of less recent trials.

3. The machine-readable medium of claim 1 wherein said calculating said average completion time comprises calculating a weighted average of stored completion times by weighting stored completion times of more recent trials more heavily than stored completion times of less recent trials.

4. The machine-readable medium of claim 1 wherein said instructions further cause said computing device to:
    redetermine said completion time in (g) for each of said S trials based on a different one or more of said presentation duration of said subject matter, said presentation duration of said query or instruction and said presentation duration of said response mechanism;
    store said redetermined completion times for said S trials; and
    perform (j), (k) and (l) based on said stored redetermined completion times of said S trials.

5. The machine-readable medium of claim 1 wherein said calculating said relative average completion time comprises dividing a computed difference between said predetermined maximum completion time and said average completion time by a computed difference between said predetermined maximum completion time and said predetermined minimum completion time, said dividing resulting in a quotient, and exponentiating said quotient.

6. The machine-readable medium of claim 1 wherein said calculating said relative average completion time comprises dividing said predetermined minimum completion time by said average completion time, said dividing resulting in a quotient, and exponentiating said quotient.

7. The machine-readable medium of claim 1 wherein said calculating said relative average completion time comprises computing a difference between one and a quotient, said quotient computed by dividing said average completion time by said predetermined maximum completion time, and exponentiating said difference.

8. The machine-readable medium of claim 1 wherein said calculating a user competency measure comprises scaling said response accuracy by a first scalar value, scaling said relative completion time by a second scalar value, and summing the scaled results.

9. The machine-readable medium of claim 1 wherein said instructions further cause said computing device to perform (a)-(l) for each of a plurality of question items of a question item set and to calculate a collective user competency measure for said question item set based on the stored user competency measures of each of said plurality of question items comprising said set.

10. The machine-readable medium of claim 9 wherein said calculating said collective user competency measure comprises calculating an average user competency measure for the question item set.

11. The machine-readable medium of claim 10 wherein said calculating said collective user competency measure further comprises combining said calculated average user competency measure with a previously calculated average competency measure for said question item set.

12. The machine-readable medium of claim 11 wherein said combining of said calculated average user competency measure with said previously calculated average user competency measure comprises weighting said average user competency measure more heavily than said previously calculated average user competency measure.

13. The machine-readable medium of claim 9 wherein said instructions further cause said computing device to perform said calculating of a collective user competency measure for other question item sets and to select for repeated presentation the question item set whose collective user competency measure is closest to but below a threshold competency measure.

14. The machine-readable medium of claim 13 wherein said threshold is a first threshold and wherein said instructions further cause said computing device to, if the collective user competency measure for all question item sets meets or exceeds said first threshold but the collective user competency measure any question item set is below a second threshold that is higher than said first threshold, select for repeated presentation the question item set whose collective user competency measure is lowest.

15. The machine-readable medium of claim 9 wherein said instructions further cause said computing device to perform said calculating of a collective user competency measure for other question item sets and , if the collective user competency measure for any question item set is below a threshold, to select for repeated presentation the question item set whose collective user competency measure is lowest.

16. The machine-readable medium of claim 9 wherein said instructions further cause said computing device to perform said calculating of a collective user competency measure for other question item sets and, if the collective user competency measure for any question item set is below a threshold, to selected for repeated presentation N question items whose user competency measures are the lowest, where N is a positive integer and wherein said N question items are drawn from any of said question item sets.

17. The machine-readable medium of claim 16 herein said instructions further cause said computing device to select for repeated presentation M question items whose user competency measures meet or exceed said threshold, where M is a positive integer that is different from or the same as N and wherein said M question items are drawn from any of said question item sets.

18. A computing device having a processor in communication with memory storing instructions for presenting a question item of an electronic learning curriculum which, when executed by said processor, cause said computing device to:
(a) retrieve from a data store a question item comprising:
textual, visual or auditory subject matter;
a query or instruction pertaining to said subject matter; and
a representation of a response mechanism for receiving a user response to said query or instruction;
(b) present said subject matter, said query or instruction and said response mechanism in a presentation sequence, wherein a presentation duration of each of said subject matter, said query or instruction and said response mechanism in said presentation sequence is controlled by, and is measured on the basis of, user input for advancing through the presentation sequence, wherein said presentation sequence comprises:
i) presenting one of said subject matter and said query or instruction; then
(ii) presenting the other of said subject matter and said query or instruction; then
(iii) presenting said response mechanism;
(c) based on said user input, determine:
a presentation duration of said subject matter by measuring a duration of display of the subject matter;
a presentation duration of said query or instruction by measuring a duration of display of the subject matter; and
a presentation duration of said response mechanism by measuring a duration of display of the subject matter;
(d) store indicators of each of said three presentation durations,
(e) receive a user response to said query or instruction via said response mechanism;
(f) ascertain a response accuracy based on said response and at least one predetermined correct response;
(g) determine a completion time for said question item based on one or more of said presentation duration of said subject matter, said presentation duration of said query or instruction and said presentation duration of said response mechanism; and
(h) store said response accuracy and said completion time for said current trial,
wherein said instructions further cause said computing device to present said question item S times by performing (b)-(h) for each of S trials, S being an integer greater than one, and to:
(i) calculate an average response accuracy for said question item based on the stored response accuracies of said S trials;
(j) calculate an average completion time for said question item based on the stored completion times of only the ones of said S trials in which a correct user response was given;
(k) calculate a relative average completion time for said question item based on said average completion time and either one or both of a predetermined minimum completion time for said question item and a predetermined maximum completion time for said question item; and
(l) calculate a user competency measure for said question item based on said average response accuracy and said relative average completion time.

19. A non-transitory machine-readable medium storing instructions that, when executed by a processor of a computing device, cause said computing device to:
(a) calculate a user competency measure for each question item in each of a plurality of question item sets comprising an electronic learning curriculum, said calculating being based on an average response accuracy for said question item and an average completion time for said question item over a plurality of trials;
(b) for each question item set of said plurality, calculate a collective user competency measure for the set based on the user competency measures of the question items of said set; and
(c) automatically select for repeated presentation the question item set whose collective user competency measure is closest to but below a threshold.

20. The machine-readable medium of claim 19 wherein said threshold is a first threshold and wherein said instructions further cause said computing device to, if the collective user competency measure for all of said question item sets meets or exceeds said first threshold but the collective user competency measure of any of said question item sets is below a second threshold that is higher than said first threshold, select for presentation the question item set whose collective user competency measure is lowest.

* * * * *

UNITED STATES PATENT AND TRADEMARK OFFICE
CERTIFICATE OF CORRECTION

| | | |
|---|---|---|
| PATENT NO. | : 8,506,305 B2 | Page 1 of 1 |
| APPLICATION NO. | : 12/342281 | |
| DATED | : August 13, 2013 | |
| INVENTOR(S) | : David Jeffrey Graham et al. | |

It is certified that error appears in the above-identified patent and that said Letters Patent is hereby corrected as shown below:

On the Title Page, Item -73-, the Assignee information "Deck Chair Learning Systems Inc., Orangeville, CA (US)" should be changed to -- Deck Chair Learning Systems Inc., Orangeville (CA) --

Signed and Sealed this
Eighth Day of April, 2014

Michelle K. Lee
*Deputy Director of the United States Patent and Trademark Office*